US011958083B2

(12) United States Patent
Scholten

(10) Patent No.: US 11,958,083 B2
(45) Date of Patent: Apr. 16, 2024

(54) FUME HOOD AND SASH CONTROL DEVICE

(71) Applicant: Johnson Controls Tyco IP Holdings LLP, Milwaukee, WI (US)

(72) Inventor: Jean H. Scholten, Roswell, GA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 41 days.

(21) Appl. No.: 17/547,510

(22) Filed: Dec. 10, 2021

(65) Prior Publication Data

US 2022/0184673 A1 Jun. 16, 2022

Related U.S. Application Data

(60) Provisional application No. 63/124,947, filed on Dec. 14, 2020.

(51) Int. Cl.
*B08B 15/02* (2006.01)
*F24F 3/163* (2021.01)
*F24F 11/00* (2018.01)

(52) U.S. Cl.
CPC ............ *B08B 15/023* (2013.01); *F24F 3/163* (2021.01); *B08B 2203/0211* (2013.01); *B08B 2203/0282* (2013.01); *F24F 11/0001* (2013.01)

(58) Field of Classification Search
CPC ........... B08B 15/023; B08B 2203/0211; B08B 2203/0282; F24F 3/163; F24F 11/0001
USPC ............................................................ 454/66
See application file for complete search history.

(56) References Cited

U.S. PATENT DOCUMENTS 3,934,496 A * 1/1976 Turko ................... B08B 15/023 454/56
5,216,782 A * 6/1993 Schenck ............... B08B 15/023 454/56
5,447,468 A * 9/1995 Tener .................... B08B 15/023 49/102
5,718,626 A * 2/1998 Rindoks .................. E05F 1/025 454/56
6,814,658 B1 * 11/2004 Rindoks ................ B08B 15/023 454/56
7,677,961 B2 * 3/2010 DeCastro .............. E05F 15/681 454/56
10,384,243 B2 * 8/2019 Wang .................... B08B 15/023

(Continued)

*Primary Examiner* — Avinash A Savani
*Assistant Examiner* — Dana K Tighe
(74) *Attorney, Agent, or Firm* — Foley & Lardner LLP

(57) ABSTRACT

A sash system includes a sash, a counter-weight coupled to the sash by a coupling member, a locking mechanism coupled to at least one of the sash and the coupling member, and a controller coupled to the locking mechanism. The locking mechanism is transitionable between an open configuration where the locking mechanism does not inhibit movement of at least one of the sash and the coupling member, and a locked configuration where the locking mechanism inhibits movement of the at least one of the sash and the coupling member. The controller is configured to control operation of the locking mechanism to selectively transition between the open configuration and the locked configuration based on a condition of the sash. The sash and the counter-weight are configured such that when the locking mechanism is in the open configuration, the sash lowers due to gravity.

20 Claims, 12 Drawing Sheets

(56) References Cited

U.S. PATENT DOCUMENTS

| | | | | |
|---|---|---|---|---|
| 2006/0121842 | A1* | 6/2006 | Worland | B08B 15/023 454/56 |
| 2010/0216383 | A1* | 8/2010 | Cathcart | B08B 15/023 454/61 |
| 2010/0248603 | A1* | 9/2010 | DeCastro | B08B 15/023 454/56 |

* cited by examiner

FUME HOOD AND SASH CONTROL DEVICE

CROSS-REFERENCE TO RELATED PATENT APPLICATIONS

The present application claims the benefit of and priority to U.S. Provisional Application No. 63/124,947, filed on Dec. 14, 2020, the entire disclosure of which is hereby incorporated by reference herein.

BACKGROUND

The present disclosure relates generally to fume hoods. More specifically, the present disclosure relates to self-closing sashes for fume hoods.

A fume hood, also known as a fume cupboard, is a working environment with localized ventilation that is frequently used in workplaces such as laboratories. The purpose of a fume hood is to minimize the leakage of airborne contaminants into the immediate surrounding environment. A laboratory technician may work with potentially harmful biological or chemical materials that are placed inside a fume hood. A ventilation system may draw air from the technician's surrounding environment, such as a laboratory, into a fume hood, and then safely vent the gases into another location.

Some designs of fume hoods feature a sash or sash window in the front opening of the fume hood. The sash can be raised to allow easier access to the materials and laboratory equipment contained within the fume hood. The sash can also be lowered when access is not required to further minimize the potential for materials to leak into the surrounding environment. Typically the sash does not close fully, but instead maintains a narrow opening. This enables the ventilation system to continue to operate.

SUMMARY

At least one embodiment relates to a sash system. The system includes a sash, a counter-weight coupled to the sash by a coupling member, and a locking mechanism. The locking mechanism is coupled to at least one of the sash and the coupling member. The locking mechanism is transitionable between an open configuration where the locking mechanism does not inhibit movement of the at least one of the sash and the coupling member, and a locked configuration where the locking mechanism inhibits movement of the at least one of the sash and the coupling member. The apparatus further includes a controller coupled to the locking mechanism and configured to control operation of the locking mechanism to selectively transition between the open configuration and the locked configuration based on the condition of the sash. The sash and the counter-weight are configured such that when the locking mechanism is in the open configuration, the sash lowers due to gravity.

In at least one embodiment, a method of controlling movement of a sash is provided. The method includes providing a sash coupled to a counter-weight by a coupling member; determining, using a controller, a condition of the sash; and operating, by the controller, a locking mechanism based on the condition of the sash to transition the locking mechanism between an open configuration where the locking mechanism does not inhibit movement of at least one of the sash and the coupling member and a locked configuration where the locking mechanism inhibits movement of the at least one of the sash and the coupling member. The counter-weight provides a balancing force against the weight of the sash. When the locking mechanism is in the open configuration, the sash tends to move toward a closed position.

In at least one embodiment, a hood enclosure assembly is provided. The hood enclosure assembly includes a hood enclosure positioned within an environment, a sash adjustably coupled to the hood enclosure, and a counter-weight coupled to the sash by a coupling member. The hood enclosure includes a plurality of sidewalls forming a work chamber and a front aperture to permit airflow between the environment and the work chamber. The sash is adjustable to cover at least a portion of the front aperture. The hood enclosure assembly further includes a locking mechanism and a controller. The locking mechanism is operatively coupled to at least one of the sash and the coupling member. The controller is configured to control operation of the locking mechanism to selectively inhibit movement of the sash based on a condition of the sash. When the locking mechanism does not inhibit movement of the sash, the sash tends to lower.

This summary is illustrative only and should not be regarded as limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1B:
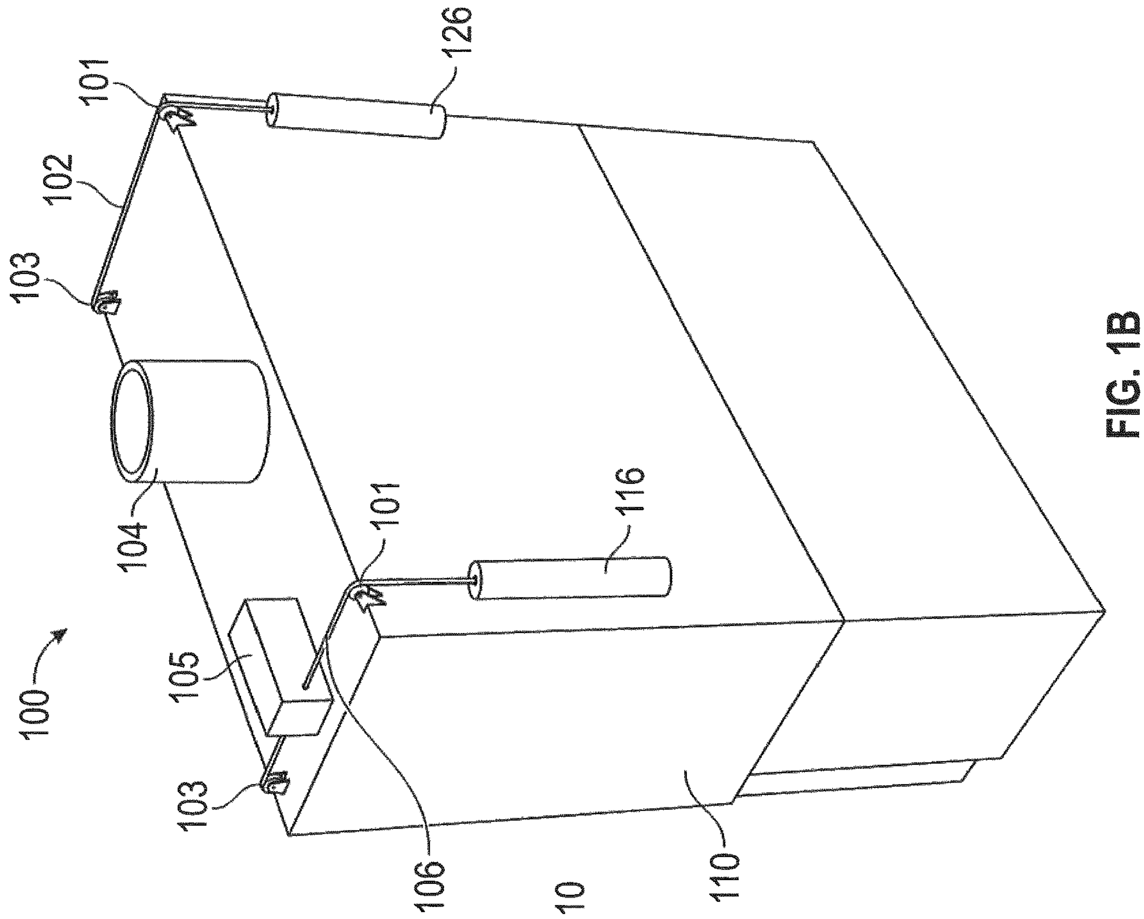
FIG. 1B is a rear perspective view of a fume hood, according to one embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates to fume hoods, including, but not limited to, the automatic lowering of a sash on the fume hood. The sash may be a transparent window or panel that slides open or closed across the front opening of a fume hood. The sash is used to control access to the interior of the fume hood, to contain the contents of the fume hood, which may be chemical and/or gaseous in nature, and to protect the user of the fume hood from hazardous materials that may otherwise flow out from the front opening of the fume hood. The sash may be made of a tempered safety glass or a laminated safety glass, although other transparent materials, including polycarbonate glazing material, may be used. The sash may slide vertically, horizontally, or a combination of the two. In some designs the sash covers the only opening into a fume hood. As such, raising and lowering the sash affects the draw of air into the fume hood. In a constant air volume (CAV) fume hood, the volume of air that is drawn through the fume hood remains constant. When the sash is lowered, the size of the opening into the fume hood is reduced. If the volumetric flow rate of air remains constant, then the velocity of the air must increase as the size of the opening reduces. This increase in air velocity is often not required to maintain the efficacy of the fume hood, and so may lead to inefficiency and wasted energy. In a system using a variable air volume (VAV) fume hood, the position of the sash is monitored, and the volumetric flow rate of air being drawn through the fume hood is adjusted in response. When the sash is lowered, the speed of fans within the system may be reduced to lower the volumetric flow rate of air being drawn through the fume hood. This maintains the velocity of air at the sash opening and increases efficiency.

Certain benefits of a VAV fume hood rely on the sash being in the closed position when the fume hood is not in use. This may not always happen with certain systems or in certain instances. For example, a person may carry equipment or materials out of a fume hood, and not have a spare hand to close the sash; a person may have contaminants on their hands that they do not wish to spread to the sash; or a person may simply forget to close the sash. Some systems can automatically close the sash of a fume hood when not in use. However these systems typically use a motor to raise and lower the sash, and do so through use of a belt or a chain. These belts or chains may experience issues such as binding up, breaking, or coming loose. They also do not operate if there is a power failure.

Various embodiments disclosed herein relate to a mechanism that can automatically lower the sash on a fume hood by providing a controlled lock and release, operate at a single point in a counter-balanced sash system, simplify both manufacturing and retro-fit installations, and/or provide automatic closing of a sash in the event of a power failure.

In one embodiment, the sash on a fume hood is attached to a counter-weight that weighs less than the sash. As such, the sash tends to lower under its own weight. A locking mechanism is placed at some point along the length of a coupling member (e.g., a cable, etc.), which connects the sash to the counter-weight. The locking mechanism provides a locking force that is sufficient to prevent the sash from closing under its own weight, but can be overcome if a person applies force to raise or lower the sash. The locking mechanism may release when force is detected, and only engage when the sash is detected to be closing under its own weight with no additional force. The locking mechanism may also release after a set period of time since a person was detected at the fume hood, and allow the sash to close under its own weight to conserve energy (e.g., in a system using a VAV fume hood), and to minimize the risk of contaminants escaping from the fume hood.

Figure 1A:
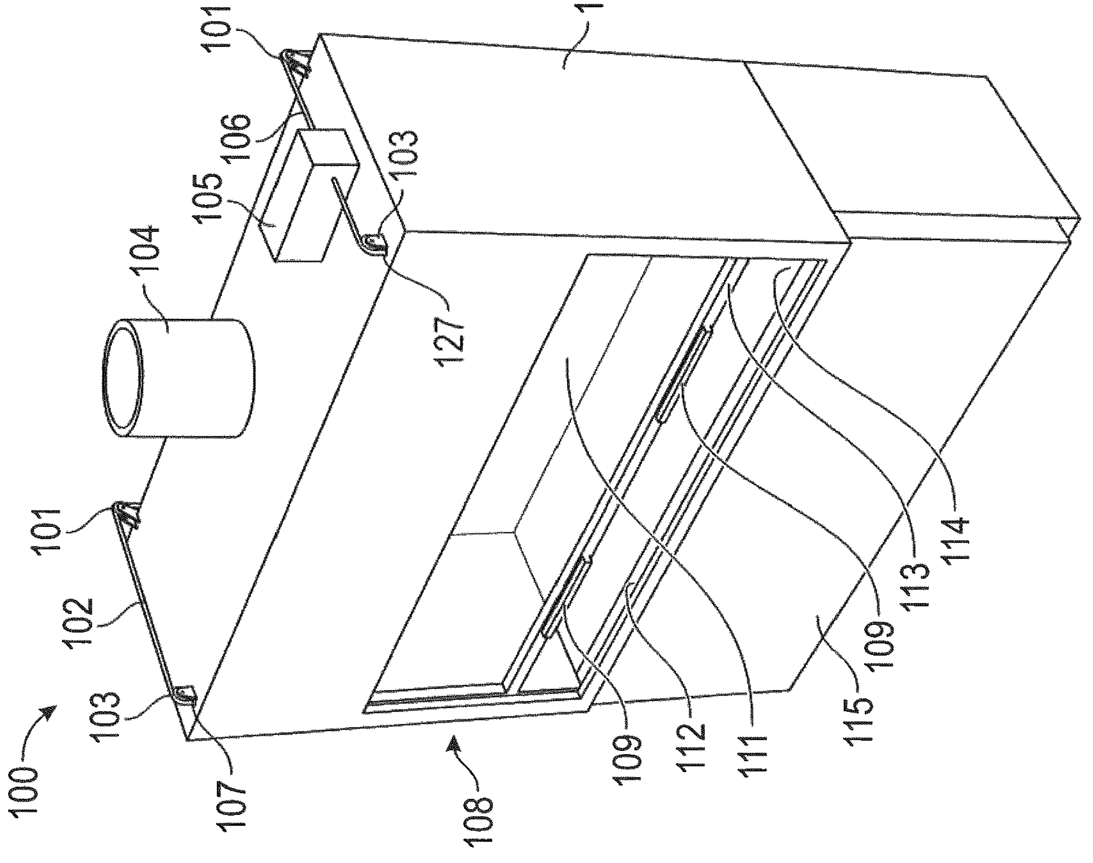
FIG. 1A is a front perspective view of a fume hood, according to one embodiment.

Turning now to FIGS. 1A-1B, a fume hood 100 is shown, according to one embodiment. FIG. 1A depicts a front perspective view and FIG. 1B depicts a rear perspective view. Fume hood 100 includes an upper housing 110 (e.g. a first or upper unit or enclosure, etc.), a work surface 114, a sash 108 (e.g. a panel member, window, sliding door, etc.), and a lower unit 115 (e.g. a second or lower unit or enclosure, etc.). The upper housing 110 includes a ventilation connection 104 (e.g. an air duct, conduit, vent, fan, etc.) through which air may travel (e.g., be drawn up or down) to or from within the fume hood 100. The lower unit 115 may include storage areas, such as cupboards or drawers. The sash 108 includes handles 109, a frame 113, and a glass window 111. According to various embodiments, the sash may take any appropriate size and/or shape and be made of any appropriate material for covering an opening of a fume hood.

In some embodiments, the sash 108 is coupled to a first counter-weight 116 and a second counter-weight 126 by a first coupling member 102 (e.g., a first counter-weight cable, belt, rope, chain, wire, etc.) and a second coupling member 106 (e.g., a second counter-weight cable, belt, rope, chain, wire, etc.). The first coupling member 102 and the second coupling member 106 may be guided by a first pulley set 101 and a second pulley set 103 (e.g. guiding members, rings, wheels, sheaves, etc.), and enter through a top of the upper housing 110 through a first opening 107 and second opening 127. In some embodiments, the combined weight of the first counter-weight 116 and the second counter-weight 126 may exactly or substantially match the weight of the sash 108. Thus, the sash 108 may be manually raised and lowered with minimal effort, and the sash 108 remains in a static position after the sash 108 is manually moved. In other embodiments, the combined weight of the first counter-weight 116 and the second counter-weight 126 may be less than the weight of the sash 108. Thus, the sash 108 may lower due to gravity when the sash 108 is not manually or otherwise supported.

In some embodiments, the sash 108 may lower due to gravity without the presence of counter-weights, such as the first counter-weight 116 and the second counter-weight 126. The first coupling member 102 and the second coupling member 106 may be replaced by one or more suspension coupling members (e.g. suspension cables). The one or more suspension coupling members may be coupled at one end to the sash 108, and may be coupled to one or more winches (e.g. springs, spring-loaded pulleys, etc.). The one or more winches may be coiled at an appropriate tension, such that there is tension in the one or more suspension coupling members and the sash 108 lowers due to gravity when the sash 108 is not manually or otherwise supported.

In some embodiments, the first coupling member 102 and second coupling member 106 may be made of any suitable material(s), including, but not limited to, metal, synthetic, or natural fibers. The first coupling member 102 and second coupling member 106 may be made from any suitable method(s), including, but not limited to, woven, braided, or twisted. In some embodiments, the first coupling member 102, the second coupling member 106, the first counter-weight 116, and the second counter-weight 126 may be arranged wholly within the upper housing 110. In other embodiments, the first coupling member 102, the second coupling member 106, the first counter-weight 116, and/or the second counter-weight 126 may be arranged in other configurations. For example, the first coupling member 102 and the second coupling member 106 may be routed to exit at the rear of the upper housing 110 and the first counter-weight 116 and the second counter-weight 126 may be positioned behind the rear of the upper housing 110.

Figure 1C:
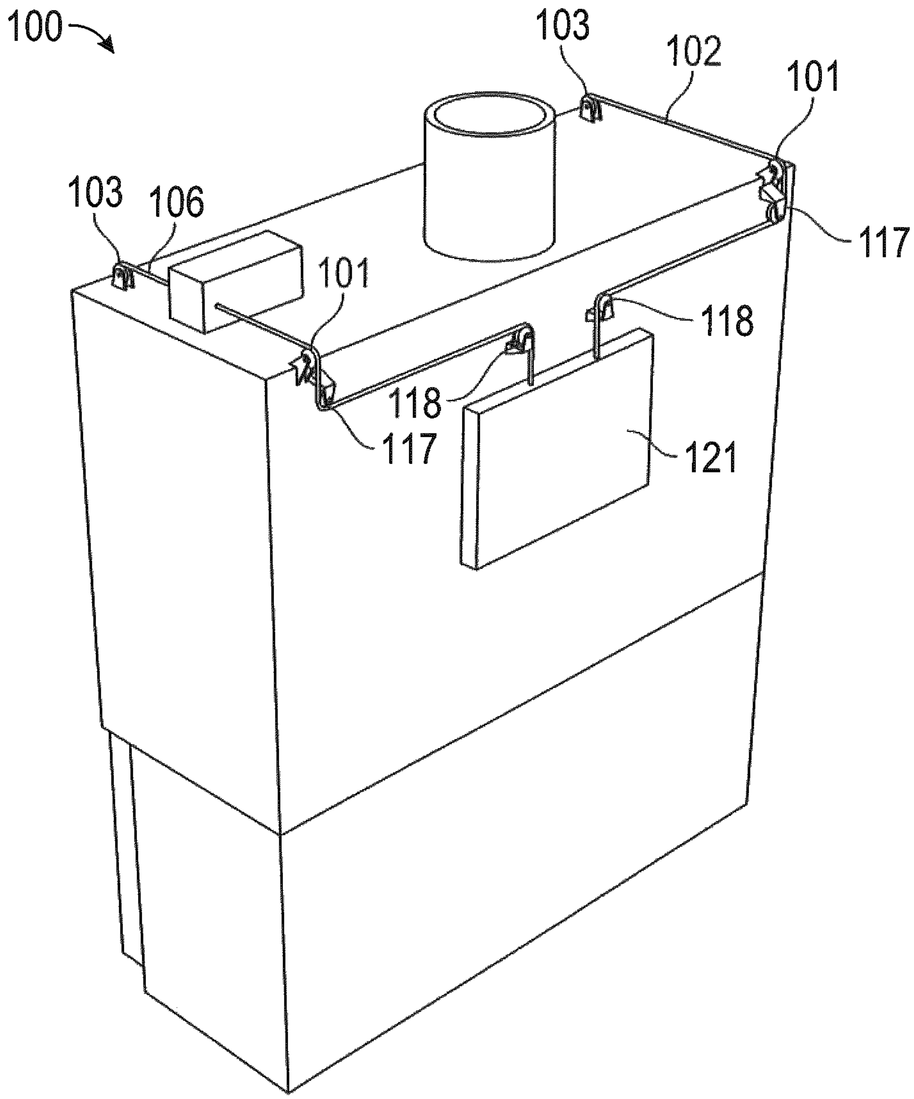
FIG. 1C is a rear perspective view of a fume hood with a single counter-weight, according to one embodiment.

Referring now to FIG. 1C, the fume hood 100 with a single counter-weight is shown, according to one embodiment. The fume hood 100 includes a single counter-weight 121. The first coupling member 102 and the second coupling member 106 are guided by a pulley set 117 and a pulley set 118 in addition to the first pulley set 101 and the second pulley set 103 as depicted in FIGS. 1A-1B. In some embodiments, the first coupling member 102 and the second coupling member 106 may be guided by a series of pulleys and then coupled to the same single counter-weight 121. In other embodiments, the first coupling member 102 and the second coupling member 106 may attach to the single counter-weight 121 with any appropriate series of pulleys.

Referring back to FIGS. 1A-1B, during use, a person may raise the sash 108 in order to gain access to the work surface 114, onto which the person may place various chemical and/or biological materials, according to one embodiment. When not in use, a person may lower the sash 108, but still leave a narrow opening 112, so that the ventilation connection 104 can continue to operate.

Figure 2:
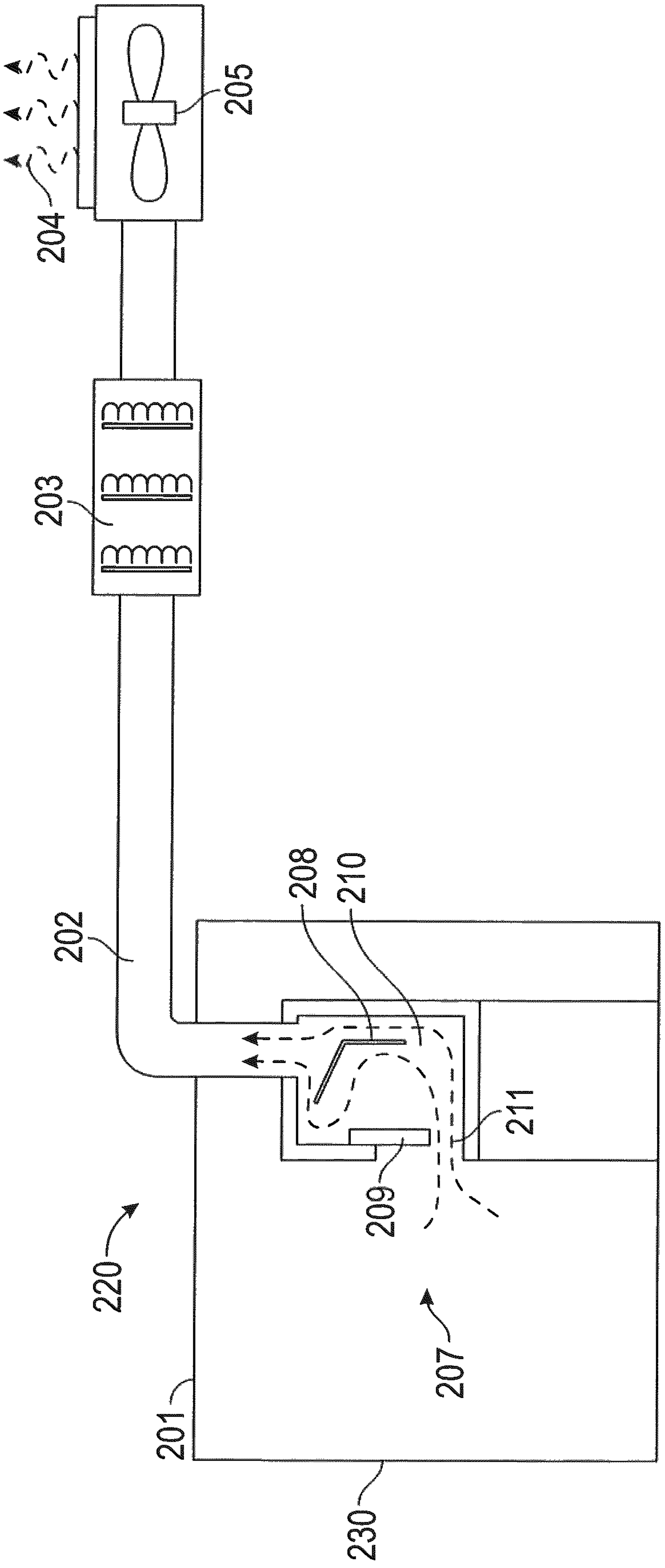
FIG. 2 is a block diagram showing a ventilation system for a fume hood, according to one embodiment.

Referring now to FIG. 2, a block diagram of a ventilation system 220 is shown, according to one embodiment. The ventilation system 220 is provided within a room 201 made up of a plurality of walls 230 (e.g. a laboratory), and includes a fume hood 207, a ductwork 202, a filter 203, a fan 205, and a different location 204 (e.g. the roof of a building, air duct system, etc.). The fume hood 207 is positioned within the room 201 and includes a sash 209, an opening 211, an upper chamber 210, and a baffle 208. The fan 205 creates a negative pressure in the ductwork 202, which draws air out of the upper chamber 210. This in turn creates negative pressure in the upper chamber 210 and causes air to be drawn into the fume hood 207 through the opening 211. The size of the opening 211 is determined by the raising and lowering of the sash 209. Air flowing through the upper chamber 210 may be directed by one or more baffles, such as the baffle 208. The air that passes through the ductwork 202 may pass through one or more filters, such as the filter 203, before being vented to the different location 204. Fume hood 207 may be, or include any of the features of, any of the fume hoods disclosed herein.

Figure 3B:
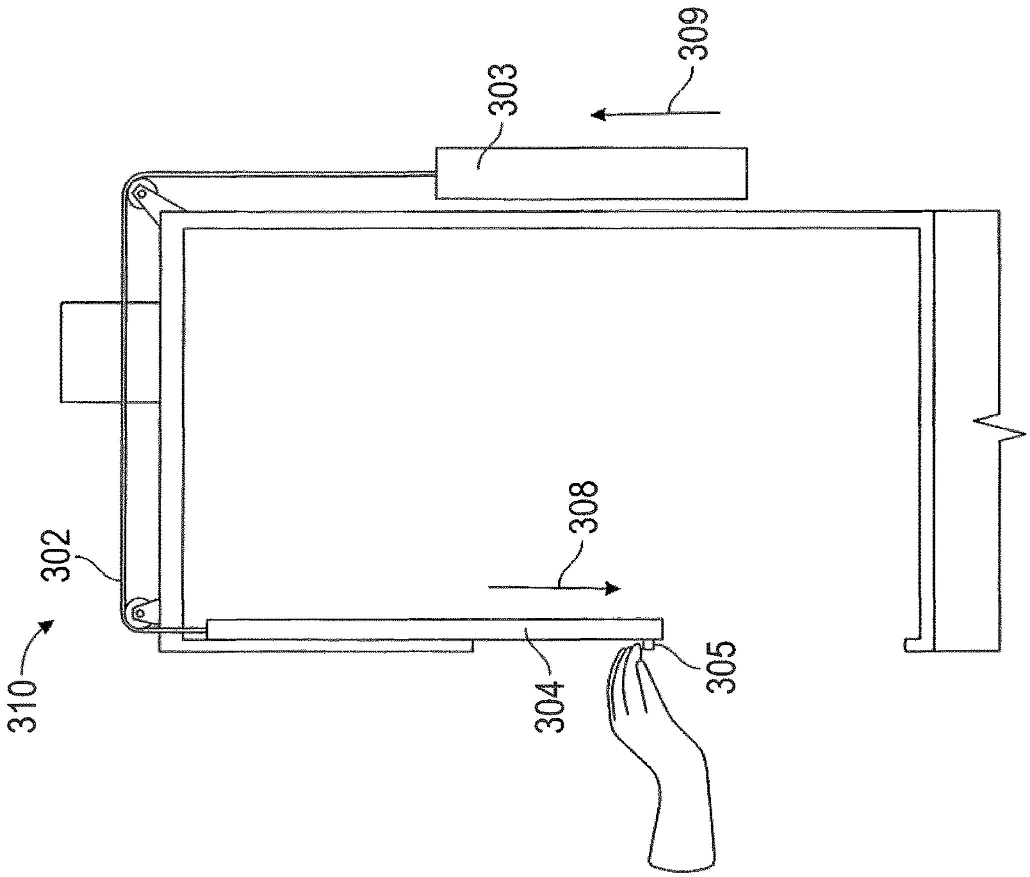
FIG. 3B is a cross-sectional view of a fume hood showing the sash being manually lowered, according to one embodiment.
Figure 3A:
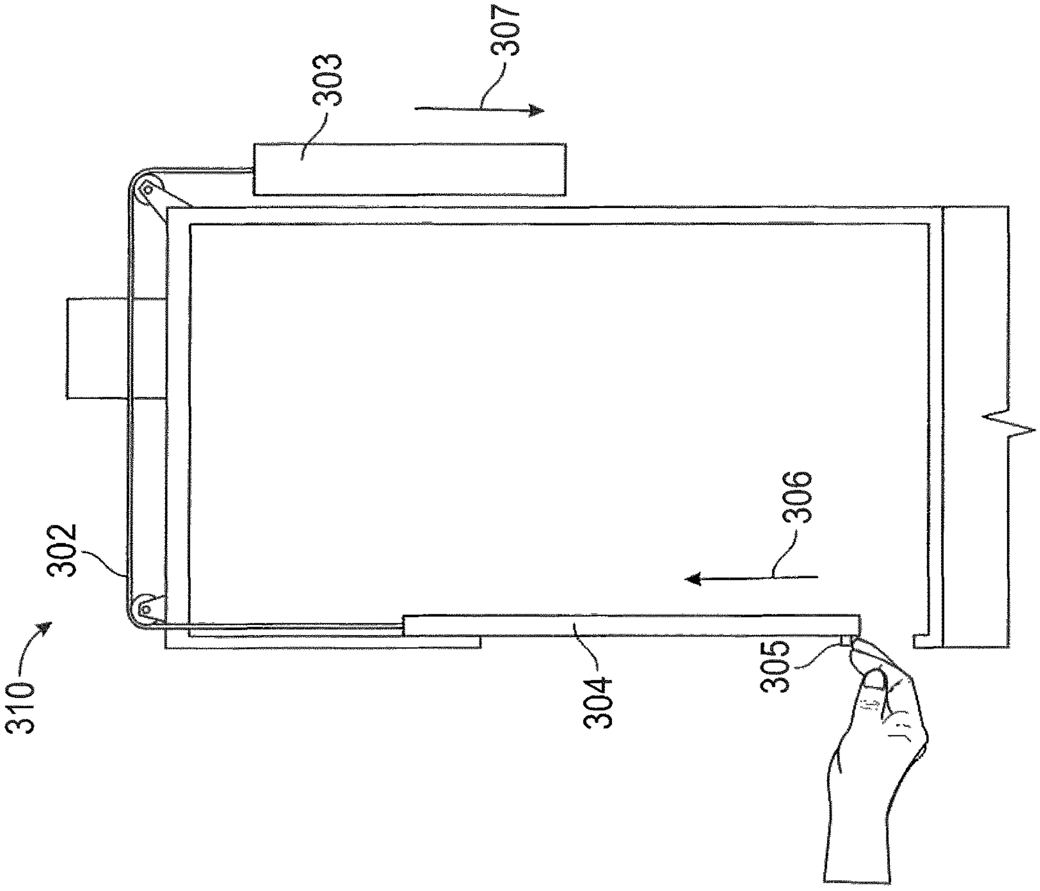
FIG. 3A is a cross-sectional view of a fume hood showing the sash being manually raised, according to one embodiment.

Referring now to FIG. 3A, a cross-sectional view of a fume hood 310 where the sash is being manually raised is shown, according to one embodiment. The fume hood 310 includes a sash 304, a coupling member 302, and counter-weight 303. The sash 304 includes a handle 305. A user applies force to the handle 305 in a first direction 306, which raises the sash 304, creates slack in the coupling member 302, and enables the counter-weight 303 to lower in a second direction 307.

Referring now to FIG. 3B, a cross-sectional view of the fume hood 310 depicted in FIG. 3A, where the sash is being manually lowered is shown, according to one embodiment. A user applies force to the handle 305 in a first direction 308, which lowers the sash 304, creates tension in the coupling member 302, and raises the counter-weight 303 in a second direction 309.

Figure 4:
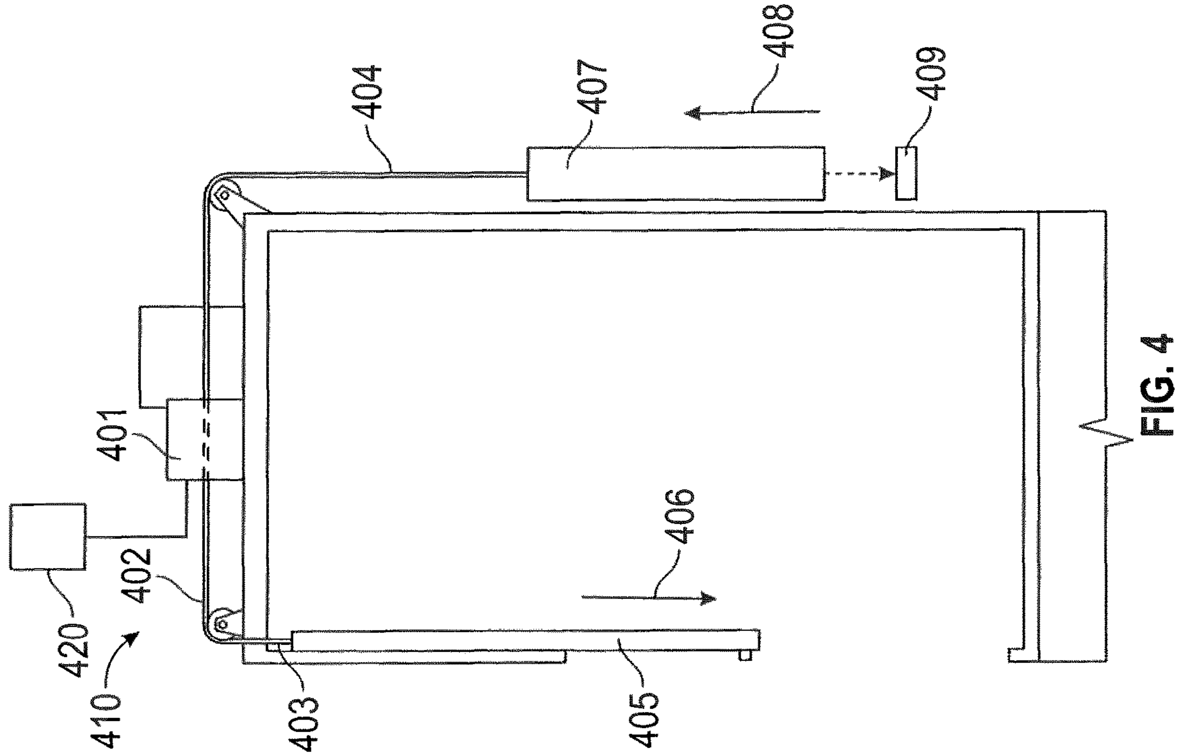
FIG. 4 is a cross-sectional view of a fume hood showing a modification to the counter-weight, according to one embodiment.

Referring now to FIG. 4, a cross-sectional view of another fume hood 410 (e.g., a counter-weight fume hood) is shown, according to one embodiment. The fume hood 410 includes a sash 405, a coupling member 402, and a counter-weight 407. The counter-weight 407 includes a counter-weight section 409. The counter-weight section 409 may be removed from the counter-weight 407, so that the counter-weight 407 weighs less than the sash 405. This imbalance of weight causes the sash 405 to tend to lower in a first direction 406 under the effect of gravity, and for the counter-weight 407 to move in a second direction 408 due to its connection to the sash 405 through the coupling member 402. The weight of the coupling member 402 may be considered when calculating the relative weights, and the weight of the counter-weight section 409 to remove. For example, when the sash 405 is in a fully open position, the combined weights of the counter-weight 407 and a second section 404 of the coupling member 402 may be less than the combined weights of the sash 405 and a first section 403 of the coupling member 402 to enable the sash 405 to close under the effect of gravity.

In some embodiments, the counter-weight section 409 represents one or more secondary portions of the counter-weight 407 that may be removed or attached to the counter-weight 407 such that the total mass of the counter-weight section 409 and the counter-weight 407 is adjustable. The one or more secondary portions of the counter-weight 407 may be in the form of adhesive sections. The counter-weight section 409 may be representative of a reduction in mass of counter-weight 407. In other embodiments the counter-weight 407 may be manufactured to have the appropriate weight. In a retrofit installation, for example, counter-weights may be replaced with counter-weights that have the appropriate weight, or mass may be removed through other means, such as filing or drilling. In other embodiments still, additional mass may be added to the sash 405, for example, in the form of adhesive weights.

In some embodiments, to control the automatic closing of the sash 405 under the effect of gravity, a locking mechanism 401 may be added that locks and releases the coupling member 402. For example, the locking mechanism 401 may lock the coupling member 402 by being coupled to the coupling member 402 and moving from an unlocked state (e.g., an open configuration, a configuration where the locking mechanism 401 does not inhibit movement of the coupling member 402, etc.) to a locked state (e.g., a closed configuration, a configuration where the locking mechanism inhibits movement of the coupling member 402, etc.). The locking mechanism 401 is positioned on the top of the fume hood 410. In other embodiments, the locking mechanism 401 may be placed at any point along the length of coupling member 402. The locking mechanism 401 is further depicted as a locking mechanism 105 in FIGS. 1A and 1B. The locking mechanism 401 may be coupled to a controller 420 such that the controller 420 can command the locking mechanism to move from an unlocked state to a locked state, or from a locked state to an unlocked state.

Figure 5:
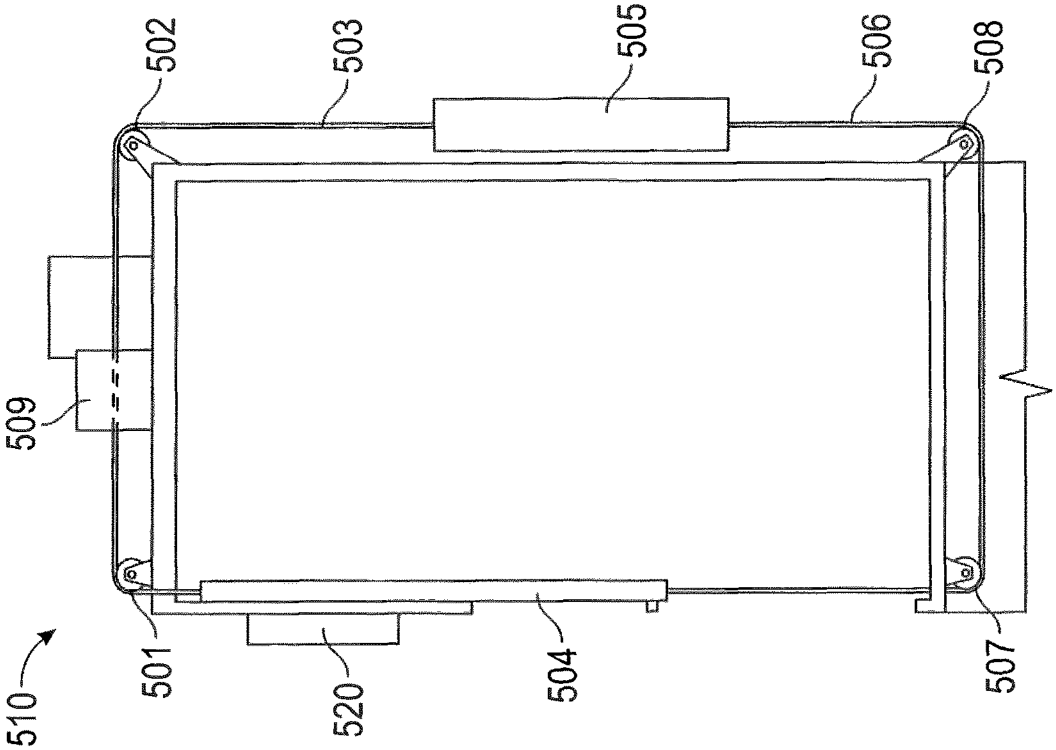
FIG. 5 is a cross-sectional view of a fume hood which includes a looping counter-weight coupling member, according to some embodiments.

Referring now to FIG. 5, a fume hood 510 with a looping coupling member is shown, according to one embodiment. The fume hood 510 includes a sash 504, a first coupling member 503, a second coupling member 506, a counter-weight 505, and pulley sets 501, 502, 508, and 507. The first coupling member 503 couples the sash 504 to the counter-weight 505 (e.g. by coupling a top of the sash 504 to a top of the counter-weight 505), guided by the pulley set 501 and the pulley set 502. The second coupling member 506 couples the sash 504 to the counter-weight 505 (e.g. by coupling a bottom of the sash 504 to a bottom of the counter-weight 505), guided by the pulley set 507 and pulley set 508. The use of the first coupling member 503 and the second coupling member 506 ensures that whether the sash 504 is raised or lowered, there is a pulling force acting in one direction on the counter-weight 505. It also ensures that the force exerted on the sash 504 to raise and lower is applied to the first coupling member 503 traveling in both directions through a locking mechanism 509. Without the second coupling member 506, when the sash 504 is raised, the only force exerted on the first coupling member 503 is the gravitational force acting on the counter-weight 505.

Figure 6A:
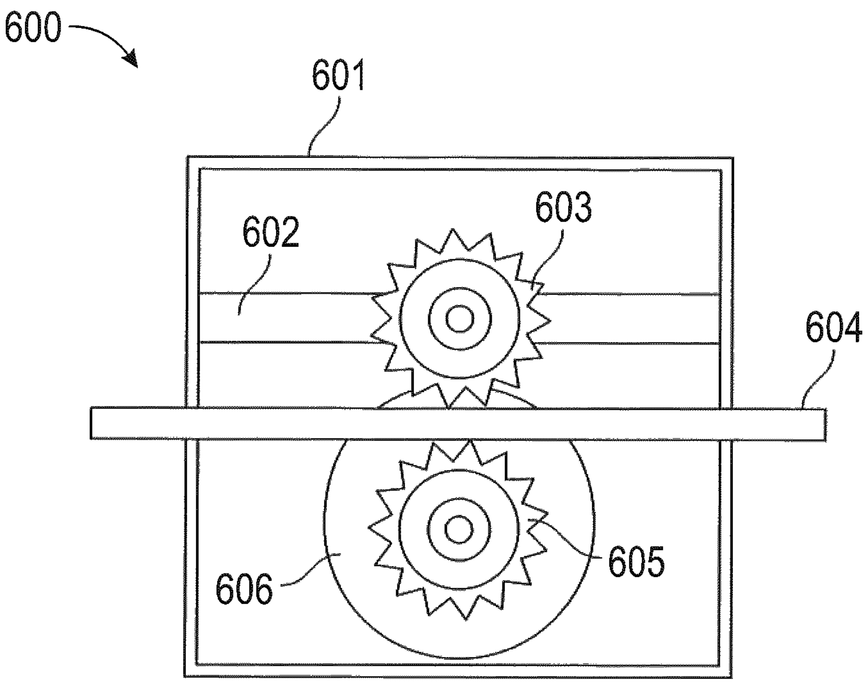
FIG. 6A is a side cross-sectional view of a counter-weight coupling member locking mechanism, according to one embodiment.
Figure 6B:
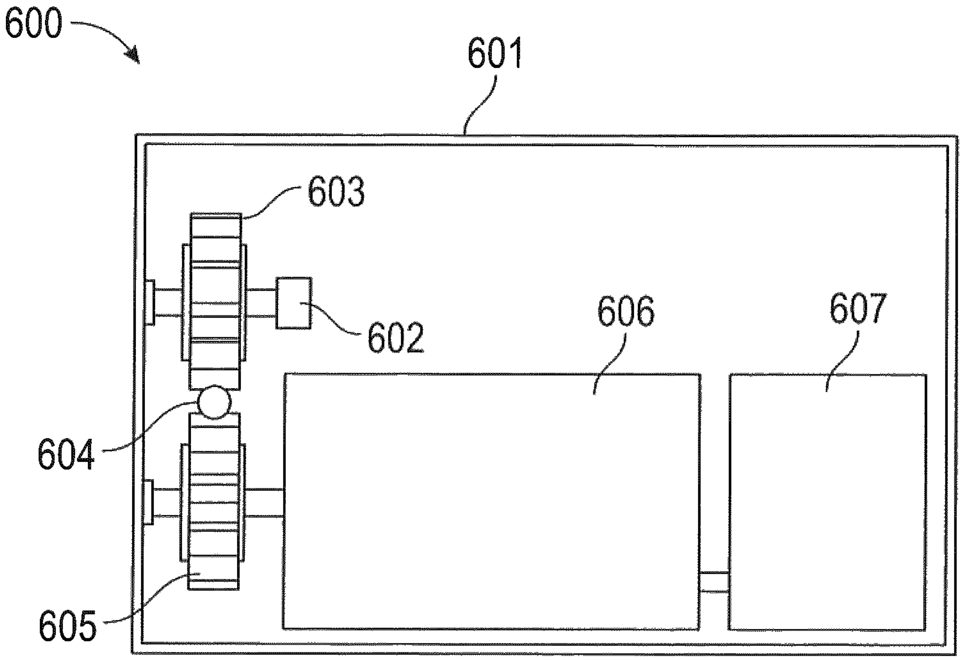
FIG. 6B is a front cross-sectional view of a counter-weight coupling member locking mechanism of FIG. 6A, according to one embodiment.

Referring now to FIGS. 6A-6B, a counter-weight coupling member locking mechanism 600 is shown, according to one embodiment. Locking mechanism 600 may be used with any of the fume hoods or other components disclosed herein. FIG. 6A depicts a side cross-sectional view and FIG. 6B depicts a front cross-sectional view. The locking mechanism 600 includes a housing 601, a motor 606, a controller 607, an active wheel 605 (e.g. a rotational member, a disk, a ring, a hoop, a circle, etc.), a passive wheel 603, and a passive wheel mounting beam 602. A coupling member 604, which may be equivalent to the second coupling member 106 of FIG. 1A and FIG. 1B (or any other suitable coupling member), enters the housing 601 from one side, passes between the active wheel 605 and the passive wheel 603, and exits the housing 601 on the opposite side. The passive wheel 603 is coupled to the passive wheel mounting beam 602 (e.g., a shaft, etc.) and may turn freely on the passive wheel mounting beam 602. The passive wheel mounting beam 602 is coupled to the housing 601. The active wheel 605 is coupled to the motor 606. The active wheel 605 may be driven by the motor 606 to resist or stop movement in the coupling member 604. The motor 606 is communicably coupled to the controller 607, such that the controller 607 may operate the motor 606. Thus, the locking mechanism 600 may be commanded, via communication between the controller 607 and the motor 606, to selectively inhibit motion of the coupling member 604 by transitioning the locking mechanism 600 between a locked state (e.g. a closed configuration, a configuration where the motor 606 is operated to lock in place therefore locking the active wheel 605 in place) and an unlocked state (e.g. an open configuration, a configuration where the motor 606 is free to rotate therefore allowing the active wheel 605 to rotate with the motion of the coupling member 604, etc.).

In some embodiments, the housing 601 is not required. The housing 601 may not be required, for example, if the locking mechanism 600 is placed within the housing of a fume hood, such as the fume hood 100 in FIGS. 1A-1B, or in another location that is protected from dust and other debris.

In some embodiments, the motor 606 is a stepper motor. In other embodiments, the motor 606 is another type of motor. Two or more independent motors may be used, where each motor drives an active wheel, such as the active wheel 605. Additional passive guide wheels, such as the passive wheel 603, may be used. The motor 606 may use electricity supplied by mains power. The mains power may be converted through use of a transformer and/or AC to DC converter to achieve the electrical supply that the motor 606 requires. The motor 606 may be powered by a battery, or a supplemental battery may be used in addition to mains power. Where the motor 606 is powered by a battery, the locking mechanism 600 is able to control the lowering of a sash, such as the sash 108 depicted in FIGS. 1A-1B, in the event of a power failure (the mains power, for example). Where the supplemental battery is rechargeable, it may be recharged by mains power. The motor 606 may operate as a dynamo, and generate electricity from the motion of the coupling member 604, which is then used to recharge a battery.

In some embodiments, one or both of the active wheel 605 and the passive wheel 603 may be made of any suitable material(s), including, but not limited to, metal, plastic, rubber, or some other material. In some embodiments, the active wheel 605 and the passive wheel 603 may be approximately or substantially identical in size. In other embodiments, one of the active wheel 605 or the passive wheel 603 may have a diameter that is substantially larger than the other. In some embodiments, one or both of the active wheel 605 and the passive wheel 603 may include teeth, ridges, bumps, and/or a central recess that receives the coupling member 604. In other embodiments, one or both of the active wheel 605 and the passive wheel 603 may include a smooth surface.

In some embodiments, both the active wheel 605 and the passive wheel 603 grip onto the coupling member 604. In other embodiments, only one of the active wheel 605 or the passive wheel 603 grips onto the coupling member 604, and the other wheel acts to force the coupling member 604 against the gripping wheel. In some embodiments, one or both of the active wheel 605 and the passive wheel 603 may include toothed cogs. All or part of the coupling member 604 may be a chain with which the toothed cogs of the active wheel 605 and/or the passive wheel 603 mesh. The active wheel 605 and the passive wheel 603 may include toothed cogs offset from the coupling member 604, where the toothed cogs mesh together so that the active wheel 605 drives the passive wheel 603. The active wheel 605 and the passive wheel 603 may include teeth to bite non-destructively into the coupling member 604, such that when the active wheel 605 locks, the coupling member 604 is prevented from moving.

Figure 7:
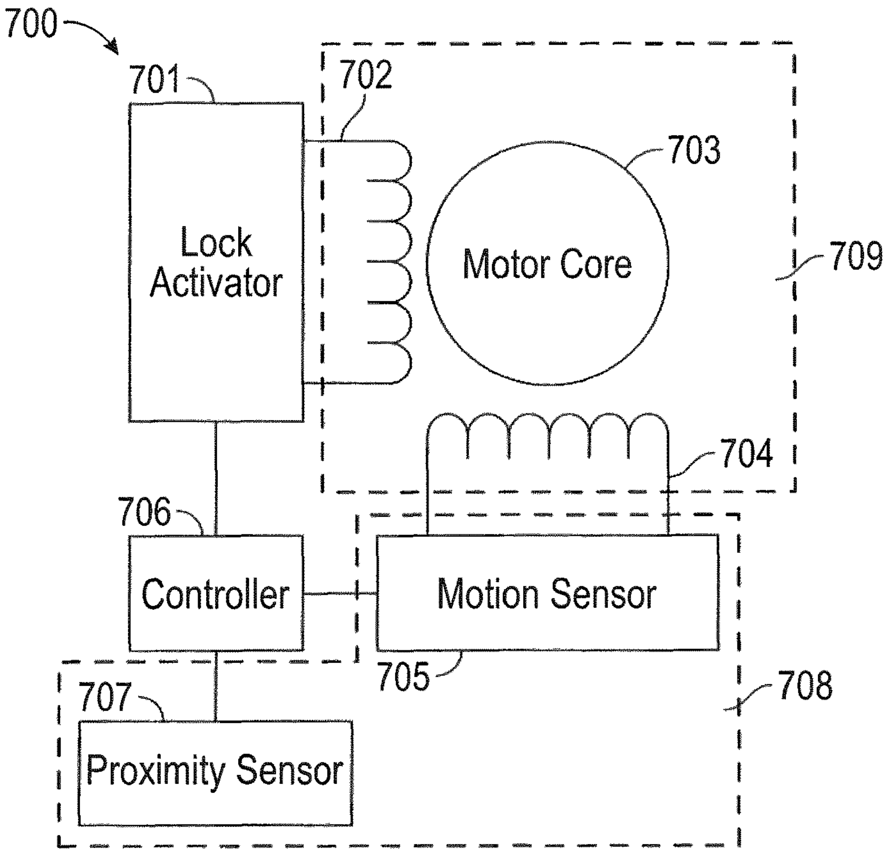
FIG. 7 is a block diagram showing components of a counter-weight coupling member locking mechanism, according to one embodiment.

Referring now to FIG. 7, a block diagram for a counter-weight coupling member locking mechanism 700 is shown, according to one embodiment. The locking mechanism 700 includes a controller 706 coupled to a lock activator 701, and a stepper motor 709. The controller 706 is further depicted as the controller 420 in FIG. 4. The stepper motor 709 includes a motor core 703 (e.g. a rotor), a first coil 702, and a second coil 704.

In some embodiments the first coil 702 and the second coil 704 may be used to form a pair of electromagnets positioned on opposite sides of the motor core 703. The lock activator 701 may be commanded by the controller 706 to supply the first coil 702 with a constant electrical current. When the lock activator 701 supplies a constant current to the first coil 702, the constant current energizes the coil 702 and causes the motor core 703 to align with the coil 702 and remain locked in place. The motor core 703 may be coupled to a wheel, such as the active wheel 605 depicted in FIGS. 6A-6B, that locks and releases a coupling member, such as the coupling member 604 depicted in FIGS. 6A-6B. Thus, via communication between the controller 706 and the lock activator 701, the locking mechanism 700 may selectively inhibit motion of the coupling member 604 by transitioning between a locked state (e.g. a closed configuration; a configuration where the lock activator 701 is engaged; a configuration where the motor core 703 is locked in place, therefore locking the active wheel 605 in place; etc.) and an unlocked state (e.g. an open configuration; a configuration where the lock activator 701 releases; a configuration where the motor core 703 is free to rotate, therefore allowing the active wheel 605 to rotate with the motion of the coupling member 604; etc.). In some embodiments, when the locking mechanism 700 is in an unlocked state, a sash coupled to the coupling member 604, such as the sash 108 depicted in FIGS. 1A-1B, will lower due to gravity. This may occur because the coupling member 604 is coupled to a counter-weight, such as the first counter-weight 116 depicted in FIGS. 1A-1B.

In some embodiments, the locking force is determined by factors that include the strength of the permanent magnets in the motor core 703 (if present), the current applied to the first coil 702, the number of windings in the first coil 702, the material from which the first coil 702 is made, and/or the material which the first coil 702 is wrapped around. A locking force may be chosen such that it prevents a sash, such as the sash 108 depicted in FIGS. 1A-1B, from lowering under its own weight, but can be overcome by a person manually raising or lowering the sash 108. In some embodiments, the lock activator 701 is connected to two or more coils, and applies a current to a chosen coil with a chosen voltage polarity to minimize the rotation required between current and locked positions.

In some embodiments, the motor core 703 is rotated in a desired direction at a desired speed by controlling the sequence in which coils, such as the first coil 702 and/or the second coil 704, are energized and de-energized. A system of gears may be placed between the motor core 703 and the active wheel 605 to adjust torque and speed of rotation.

In some embodiments, the locking mechanism 700 further includes a sensor assembly 708 coupled to the controller 706. The sensor assembly 708 includes a motion sensor 705 and/or a proximity sensor 707. The motion sensor 705 and the proximity sensor 707 are each communicably coupled to the controller 706. The sensor assembly 708 may be configured to sense condition data (e.g. position, movement, speed, etc.) associated with a sash and/or the surrounding environment, such as the sash 108 depicted in FIG. 1, and communicate the condition data of the sash 108 to the controller 706.

In some embodiments, movement of the sash 108 results in the movement of a coupling member, such as the coupling member 604 depicted in FIGS. 6A-6B. Movement of the coupling member 604 results in a rotation of the active wheel 605 and the motor 606 coupled to the active wheel 605 depicted in FIGS. 6A-6B. Rotation of the motor 606 may result in rotation of the motor core 703. The rotation of the motor core 703 induces an electrical current in the second coil 704. The second coil 704 is coupled to the motion sensor 705. The motion sensor 705 detects the induced electrical current in the second coil 704 and sends a corresponding signal to the controller 706 causing it to determine the motion in the coupling member 604, and therefore the motion of the sash 108. A frequency of pulses of the induced current may also be used by the controller 706 to determine a speed at which the motor core 703 is rotating.

In some embodiments, a polarity of the voltage of the induced current in the second coil 704 may be used by the controller 706 to determine a direction in which the motor core 703 is being rotated. For example, this may be inferred from the induced current recorded when the lock activator 701 is engaged. The orientation of the motor core 703 is known from the polarity of the voltage applied to the first coil 702. The orientation of the motor core 703 can be inferred from the polarity of the voltage of the current induced in the second coil 704. The polarity of these two voltages can be used by the controller 706 to determine the initial direction of rotation in the motor core 703. The motion sensor 705 may monitor two or more coils and a sequence of induced current and/or polarities may be used by the controller 706 to determine a direction of rotation for the motor core 703.

In some embodiments, the controller 706 may determine when to lock and when to release a coupling member, such as the second coupling member 106 depicted in FIGS. 1A-1B, for an efficient operation of a fume hood, such as the fume hood 100 depicted in FIGS. 1A-1B. The controller 706 may lock and release the second coupling member 106 based on a condition of a sash, such as the sash 108 depicted in FIGS. 1A-1B. The controller 706 may receive sensor data associated with a motor from a sensor and control operation of the locking mechanism 700 or lock activator 701 based on the sensor data. The controller 706 may be configured to evaluate data collected by the motion sensor 705 to determine that the motion of the sash 108 is too fast to be caused solely by the sash 108 lowering under its own weight (e.g. the sash is being manually moved), and so transition the locking mechanism 700 to an unlocked state and/or command the lock activator 701 to release (e.g. by commanding the lock activator 701 to not supply a constant electric current to the first coil 702, allowing the motor core 703 to rotate freely). The controller 706 may be configured to evaluate data collected by the motion sensor 705 to determine that the motion of the sash 108 is of a speed and direction commensurate with the sash 108 lowering under its own weight (e.g. due to gravity), and so transition the locking mechanism 700 to a locked state and/or command the lock activator 701 to engage (e.g. by commanding the lock activator 701 to supply a constant electric current to the first coil 702, causing the motor core 703 to remain locked in place). The controller 706 may be configured to identify a sequence representing a person moving the sash 108 followed by the sash 108 in freefall, and to then command the lock activator 701 to engage. This may represent a person moving the sash 108 to a desired position, which should then be maintained by the locking mechanism 700 (e.g. the locking mechanism is in an unlocked state and the sash 108 is not lowering).

In some embodiments, detection of motion (by the motion sensor 705, for example) while the lock activator 701 is currently engaged indicates that the sash 108 is being moved manually. This may represent a person moving the sash 108 to a new position while it is in a locked state. Under these conditions, the controller 706 commands the lock activator 701 to release, and enable a person to move the sash 108 freely.

In some embodiments, the controller 706 includes a timer to record the time elapsed after a transition to a locked or unlocked state in the locking mechanism 700. The controller 706 may be configured to automatically command the lock activator 701 to release after a set period of time has elapsed (e.g. a time since the last movement of the sash 108 exceeds a threshold time value). A person using a fume hood could reset the timer by manually raising the sash 108.

In some embodiments, the proximity sensor 707 is an infrared sensor that detects body heat, an ultrasonic or laser sensor that detects proximity, a sound sensor that detects noise in the vicinity of the fume hood 100, a Bluetooth® low energy (BLE) sensor that detects proximity of a BLE tag, or some other type of sensor. The controller 706 may start a timer when the proximity sensor 707 no longer reports the presence of a person at the fume hood 100, and may command the lock activator 701 to release if the timer exceeds a predetermined threshold time (e.g. no person is proximate to the sash 108, the time since a person was proximate to the sash 108 exceeds a threshold time value, etc.). Detection of a person in proximity to the fume hood 100 may reset the timer. The proximity sensor 707 is further depicted as a proximity sensor 520 in FIG. 5.

In some embodiments, sash handles, such as the handles 109 depicted in FIGS. 1A-1B, feature force switches that determine when a handle is being pulled upwards or pushed downwards. The state of these switches may indicate to a controller (e.g., controller 706) if a person is attempting to raise or lower the sash 108, and be used as an alternative to, or in conjunction with the motion sensor 705 to determine direction of motion in the sash 108.

In some embodiments, the controller 706 uses information provided by the motion sensor 705 to determine the current position of the sash 108. This information is transmitted to a variable air volume (VAV) controller to adjust the flow rate in response to the position of the sash 108. In other embodiments, the controller 706 may use information provided by a VAV controller, or other sensors in the fume hood 100, to determine the position of the sash 108. If the lock activator 701 is currently released, then detecting no motion may indicate that descent of the sash 108 has been blocked. If the controller 706 determines that the sash 108 is not at its lowest possible position, then the blockage may be caused by an obstruction, such as a person's arm. In this situation, the controller 706 may command the lock activator 701 to engage.

Figure 8:
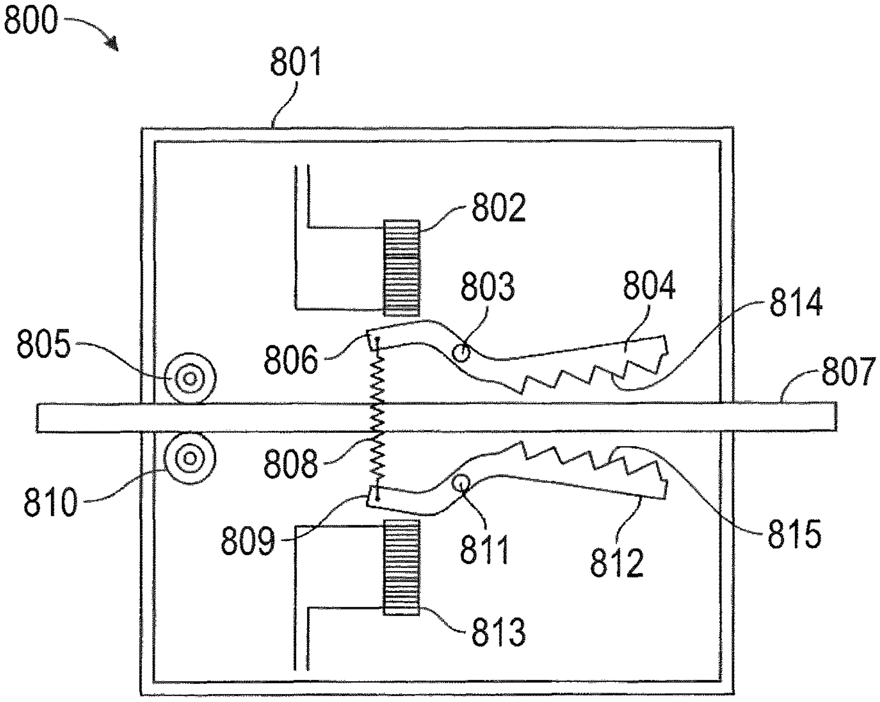
FIG. 8 is a cross-sectional view of a coupling member locking mechanism that incorporates a mechanical gripper, according to one embodiment.

Referring now to FIG. 8, a cross-sectional view of a coupling member locking mechanism 800 that incorporates a mechanical gripper is shown, according to one embodiment. The locking mechanism 800 includes an enclosure 801, a first gripper arm 804 (e.g. a gripping member, rod, clamp, tong), a second gripper arm 812, a first electromagnet 802, a second electromagnet 813, a first roller 805, and a second roller 810. A coupling member 807, such as the coupling member 402 depicted in FIG. 4, passes between the first roller 805 and the second roller 810 and between the first gripper arm 804 and the second gripper arm 812. The coupling member 807 may be coupled to a sash, such as the sash 405 depicted in FIG. 4, and a counter-weight, such as the counter-weight 407 depicted in FIG. 4.

In some embodiments, the first gripper arm 804 includes a first distal segment 806, a first pivot 803, and a first gripping segment 814. The second gripper arm 812 includes a second distal segment 809, a second pivot 811, and a second gripping segment 815. The first gripper arm 804 and/or the second gripper arm 812 may feature curves or bends along their length(s), such that the first distal segment 806 and/or the second distal segment 809 are offset from the coupling member 807. The locking mechanism 800 further includes a spring 808 coupled at each distal end of the first distal segment 806 and the second distal segment 809.

In some embodiments, the first electromagnet 802 and/or the second electromagnet 813 are de-energized when the locking mechanism 800 is in an unlocked state. The spring 808 is under tension, and pulls the first distal segment 806 and the second distal segment 809 towards each other. This in turn rotates the first gripper arm 804 about the first pivot 803 and the second gripper arm 812 about the second pivot 811, and separates the first gripping segment 814 and the second gripping segment 815 from the coupling member 807. Thus, the first gripping segment 814 and the second gripping segment 815 release the coupling member 807 and do not inhibit the movement of the coupling member 807. The first roller 805 and/or the second roller 810 may be in contact with the coupling member 807, but offer minimal resistance.

In some embodiments, the first electromagnet 802 and/or the second electromagnet 813 are energized when the locking mechanism 800 is in a locked state. A magnetic force generated by the first electromagnet 802 attracts the first distal segment 806, and/or a magnetic force generated by the second electromagnet 813 attracts the second distal segment 809. The spring 808 is placed under increased tension. This in turn rotates the first gripper arm 804 about the first pivot 803 and/or the second gripper arm 812 about the second pivot 811, and engages the first gripping segment 814 and/or the second gripping segment 815 with the coupling member 807. The first gripping segment 814 and the second gripping segment 815 may feature teeth that are angled, such that motion of the coupling member 807 in one direction exerts a force on the first gripping segment 814 and the second gripping segment 815 that pulls them closer together. The first gripper arm 804 and the second gripper arm 812 may feature ridges or curved surfaces and may be made from any appropriate material(s), including, but not limited to, metal, plastic, or rubber.

In some embodiments, the locking mechanism 800 is coupled to control components, such as the lock activator 701 depicted in FIG. 7. The first electromagnet 802 and/or the second electromagnet 813 may be coupled to the lock activator 701. A controller, such as the controller 706 depicted in FIG. 7, may be configured to command the lock activator 701 to energize the first electromagnet 802 and/or the second electromagnet 813 by supplying an electrical current. The controller 706 may be further configured to command the lock activator 701 to not provide the first electromagnet 802 and/or the second electromagnet 813 with an electrical current such that the first electromagnet 802 and/or the second electromagnet 813 are de-energized. Thus, the locking mechanism 800 may be commanded, via communication between the controller 706 and the lock activator 701, to selectively inhibit motion of the coupling member 807 by transitioning the locking mechanism 800 between a locked state (e.g. a closed configuration; a configuration where the first electromagnet 802 and/or the second electromagnet 813 are energized and therefore the first gripper arm 804 and/or the second gripper arm 812 engage the coupling member 807 to lock it in place; etc.) and an unlocked state (e.g. an open configuration; a configuration where the first electromagnet 802 and/or the second electromagnet 813 are de-energized and therefore the first gripper arm 804 and/or the second gripper arm 812 do not engage the coupling member 807, leaving the coupling member 807 free to move; etc.).

In some embodiments, the locking mechanism 800 is coupled to sensing components, such the sensor assembly 708 depicted in FIG. 7. One or both of the first roller 805 and/or the second roller 810 may be connected to the motion sensor 705 of sensor assembly 708. One or both of the first roller 805 and/or the second roller 810 may be a motion sensing roller that uses an optical, mechanical, or electrical system to detect rotation of the roller. The motion sensing roller may measure the angle and/or frequency of rotations, which may be used to determine the distance, speed, and/or direction in which the coupling member 807 moves. The distance, speed, and/or direction in which the coupling member 807 moves may be communicated to a controller, such as the controller 706 depicted in FIG. 7, as condition data associated with a sash and/or the surrounding environment, such as the sash 108 depicted in FIGS. 1A-1B. The controller 706 may determine the condition of the sash 108 based on the condition data and further determine when to transition the locking mechanism 800 between a locked state and an unlocked state based on the condition of the sash 108.

Figure 9B:
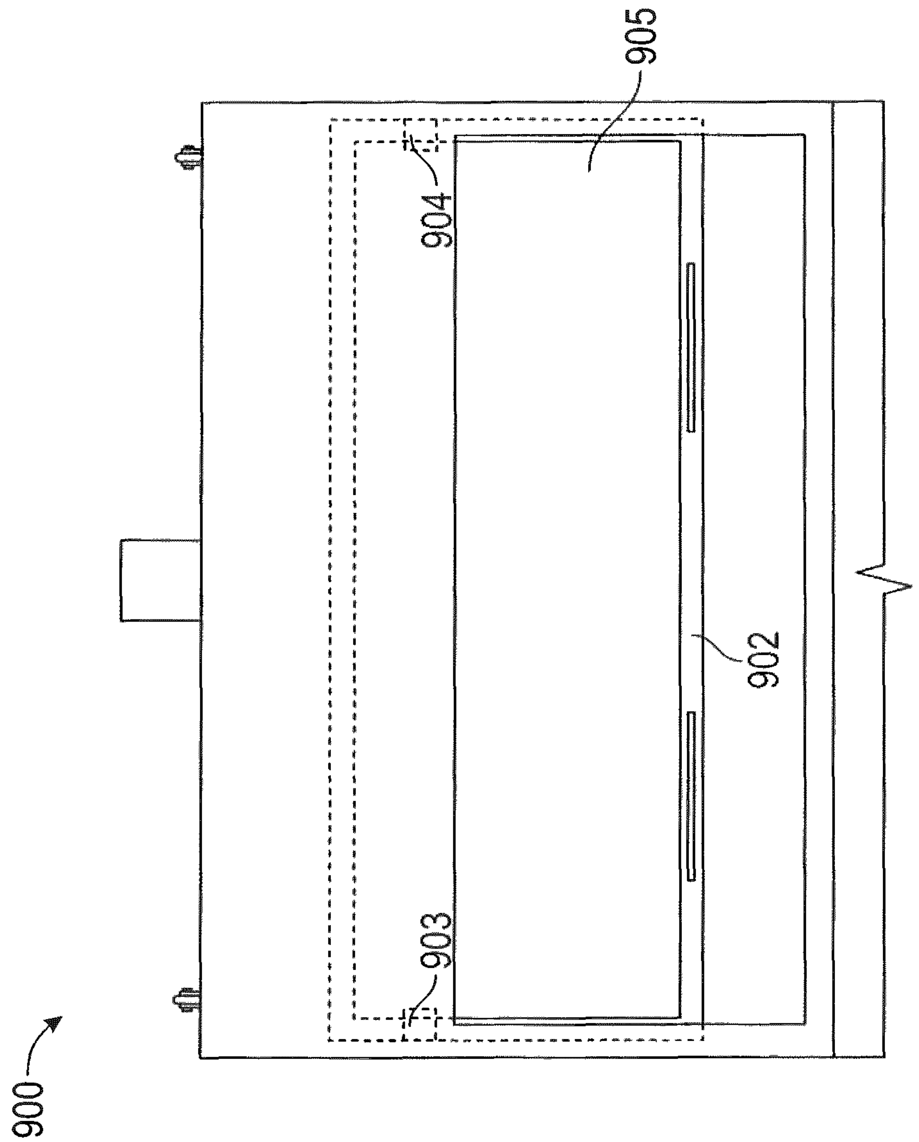
FIG. 9B is a front-elevation view of a fume hood showing the placement of locking mechanisms that act directly on a sash, according to one embodiment.
Figure 9A:
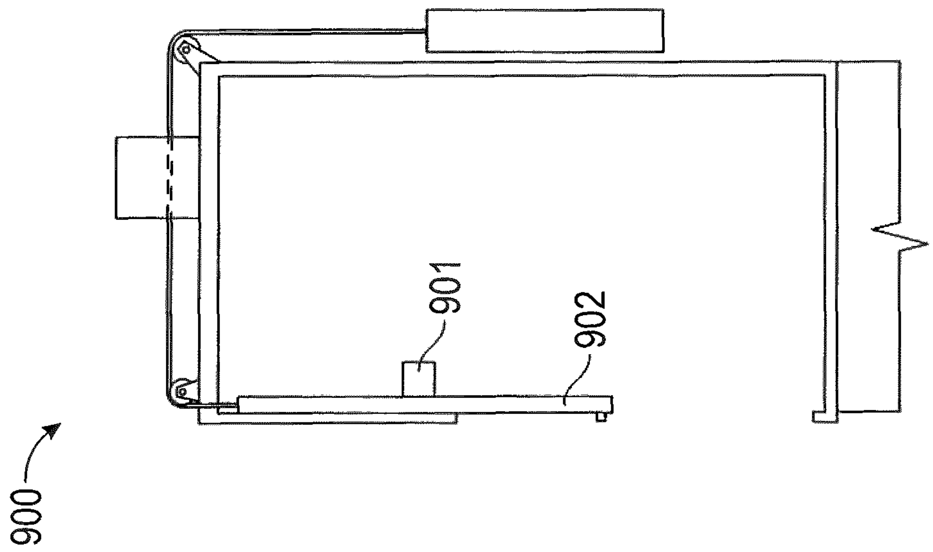
FIG. 9A is a cross-sectional side-elevation view of a fume hood showing locking mechanisms that act directly on a sash, according to one embodiment.

Referring now to FIGS. 9A-9B, a fume hood 900 is shown, according to one embodiment. A locking mechanism 901 is positioned such that it is in contact with, or in proximity to, a sash frame 902 (e.g. panel member frame, window frame, door frame, etc.) such that the locking mechanism 901 may operate directly on or interface with and/or engage the sash frame 902. The sash frame 902 may be coupled to a sash 905. In some embodiments, the locking mechanism 901 is positioned so that it remains in contact with, or in proximity to, the sash frame 902 through all possible positions of the sash frame 902 (i.e. from fully closed to fully open). Possible arrangements for the locking mechanism 901 are described in relation to FIG. 10, FIG. 11A, and FIG. 11B.

Figure 10:
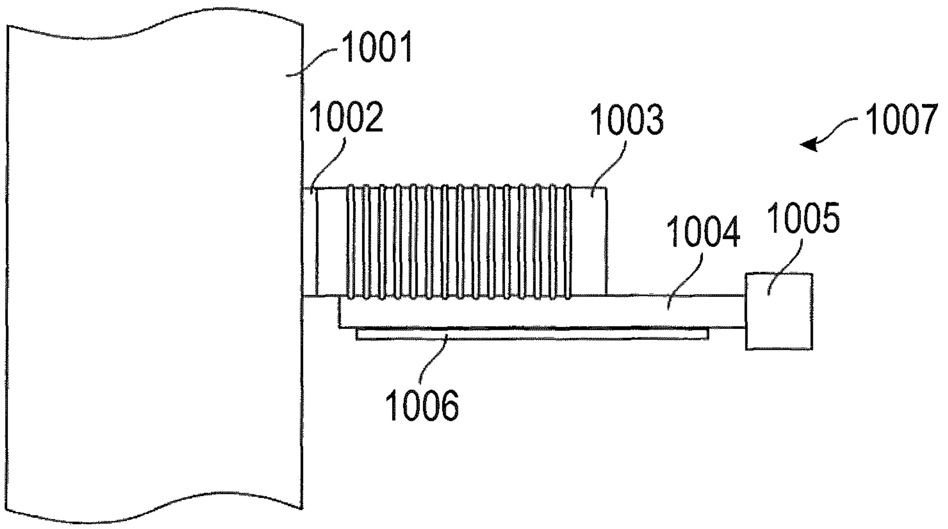
FIG. 10 is a side-elevation view of an electromagnet locking mechanism, according to one embodiment.

Referring now to FIG. 10, a locking mechanism 1007 is shown, according to one embodiment. The locking mechanism 1007 may be an electromagnet locking mechanism. The locking mechanism 1007 includes an electromagnet 1003, a support arm 1004 coupled to the electromagnet 1003, an anchor point 1005 coupled to the support arm 1004, a contact plate 1002 coupled to the electromagnet 1003, and a bend sensor 1006 coupled to the support arm 1004. The locking mechanism 1007 is placed in contact with a sash frame 1001. The sash frame 1001 may be coupled to a sash, such as the sash 905 depicted in FIG. 9B. In some embodiments, the locking mechanism 1007 is positioned at a first position 903, as depicted in FIG. 9B. In other embodiments, the locking mechanism 1007 is positioned at a second position 904, as depicted in FIG. 9B. In some embodiments, the sash frame 1001 is constructed entirely from a ferromagnetic material. In other embodiments, the sash frame 1001 includes ferromagnetic portions that align with the locking mechanism 1007. The electromagnet 1003 may be energized to transition the locking mechanism 1007 to a locked state and de-energized to transition the locking mechanism 1007 to an unlocked state. When the electromagnet 1003 is energized, the electromagnet 1003 produces an attractive magnetic force that attracts the ferromagnetic portion of the sash frame 1001.

In some embodiments, the contact plate 1002 may be made from a low-friction material such as felt, that enables the sash frame 1001 to slide past the locking mechanism 1007 when the electromagnet 1003 is de-energized, but when the electromagnet 1003 is energized, the magnetic force is sufficient to prevent the sash frame 1001 and sash 905 from lowering under their combined weight. In other embodiments, the contact plate 1002 may be constructed from a high-friction material, such as rubber, and a narrow air-gap between the contact plate 1002 and the sash frame 1001 enables the sash frame 1001 and the sash 905 to move freely. When the electromagnet 1003 is energized, the attractive force between the electromagnet 1003 and the sash frame 1001 is sufficient to move one or both of the electromagnet 1003 and the sash frame 1001 to close the air-gap. In other embodiments still, the contact plate 1002 may not be used.

In some embodiments, the support arm 1004 may be attached to a fume hood housing only via the anchor point 1005. The support arm 1004 may be constructed from any appropriate material(s), including, but not limited to, metal, plastic, or any other material with sufficient rigidity to support the electromagnet 1003, but to enable a degree of flexing. The bend sensor 1006 may be used to measure the deformation of the support arm 1004. The bend sensor 1006 may measure both a direction and a degree of deformation.

In some embodiments, the locking mechanism 1007 is coupled to control components, such as the lock activator 701 depicted in FIG. 7. The electromagnet 1003 may be coupled to the lock activator 701. A controller, such as the controller 706 depicted in FIG. 7, may be configured to command the lock activator 701 to energize the electromagnet 1003 by supplying the electromagnet 1003 with an electrical current. When the electromagnet 1003 is supplied with an electrical current, the electromagnet 1003 becomes energized. When the electromagnet 1003 is energized, the electromagnet 1003 produces an attractive magnetic force between the electromagnet 1003 and the ferromagnetic portion of the sash frame 1001 sufficient to prevent the sash frame 1001 from moving freely. The controller 706 may be further configured to command the lock activator 701 to not provide the electromagnet 1003 with an electric current, such that the electromagnet 1003 is not energized and is not producing an attractive magnetic. Thus, the locking mechanism 1007 may be commanded, via communication between the controller 706 and the lock activator 701, to selectively inhibit motion of the sash 905, by transitioning the locking mechanism 1007 between a locked state (e.g. a closed configuration; a configuration where the electromagnet 1003 is energized by the lock activator 701, and therefore the attractive force between the electromagnet 1003 and the sash frame 1001 prevents movement of the sash 905; etc.) and an unlocked state (e.g. an open configuration; a configuration where the electromagnet 1003 is not energized by the lock activator 701, and therefore the sash 905 is free to move; etc.).

In some embodiments, the locking mechanism 1007 may be connected to sensing components, such as the sensor assembly 708 depicted in FIG. 7. The bend sensor 1006 may be included in the sensor assembly 708. In other embodiments, the bend sensor 1006 may be coupled to a controller, such as the controller 706 depicted in FIG. 7. The bend sensor 1006 may record a "normal" deformation value in the unlocked state that includes deformation due to the weight of components such as the electromagnet 1003 and the additional weight of a sash, such as the sash 905 depicted in FIG. 9B, under the effect of gravity. The controller 706 may be configured to receive signals from the sensor assembly 708 or the bend sensor 1006 and calculate a difference between the current reading and the "normal" reading of the deformation value to determine whether the sash frame 1001 is being raised or lowered.

In some embodiments, the locking mechanism 1007 may be configured such that a sash, such as the sash 905 depicted in FIG. 9B, may be lowered without the presence of counter-weights, such as the first counter-weight 116 and the second counter-weight 126 depicted in FIGS. 1A-1B. The locking mechanism 1007 may be configured such that when the locking mechanism 1007 is in a locked state, the weight of the sash is frictionally held against the contact plate 1002, and the motion of the sash 905 is inhibited. The locking mechanism 1007 may be further configured such that when the locking mechanism 1007 is in an unlocked state, the electromagnet 1003 is energized enough such that the sash 905 frictionally glides downward due to gravity, sliding against the contact plate 1002.

Figure 11A:
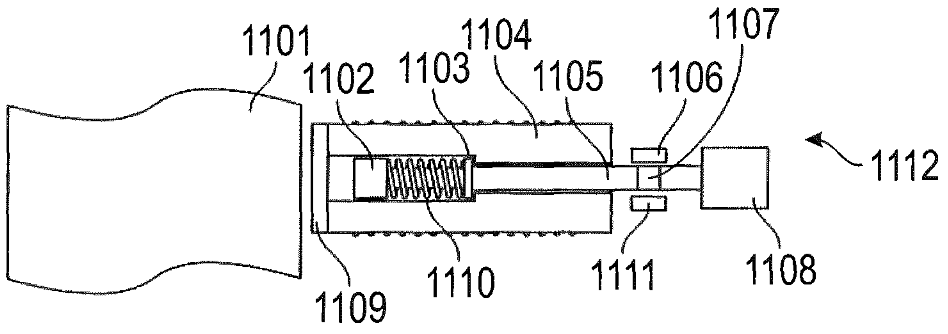
FIG. 11A is a cross-sectional side-elevation view of an electromagnet locking mechanism with spring retraction, shown in a retracted position, according to one embodiment.

Referring now to FIG. 11A, a locking mechanism 1112 is shown, according to one embodiment. The locking mechanism 1112 may be an electromagnet locking mechanism with spring retraction. The locking mechanism 1112 is shown in a retracted position. The locking mechanism 1112 includes an electromagnet 1104, a contact plate 1109 coupled to the electromagnet 1104, a support arm 1105 positioned at least partially within the electromagnet 1104 and including a conductive point 1107, a spring 1110 positioned about the support arm 1105, a spring retention head 1102 coupled to a first end of the spring 1110 and a first end of the support arm 1105, a washer 1103 coupled to a second end of the spring 1110 and positioned about the support arm 1105, a first conductive plate 1106 positioned in proximity to the conductive point 1107, a second conductive plate 1111 positioned in proximity to the conductive point 1107, and an anchor point 1108 coupled to a second end of the support arm 1105. The locking mechanism 1112 may be placed in proximity to a sash frame 1101. The sash frame 1101 may be coupled to a sash, such as sash 905 depicted in FIG. 9B. In some embodiments, the locking mechanism 1112 may be positioned at a first position, such as the first position 903 depicted in FIG. 9B. In other embodiments, the locking mechanism 1112 may be positioned at a second position, such as the second position 904 depicted in FIG. 9B. The locking mechanism 1112 is in an unlocked state (e.g. a retracted state) when the electromagnet 1104 is de-energized.

Figure 11B:
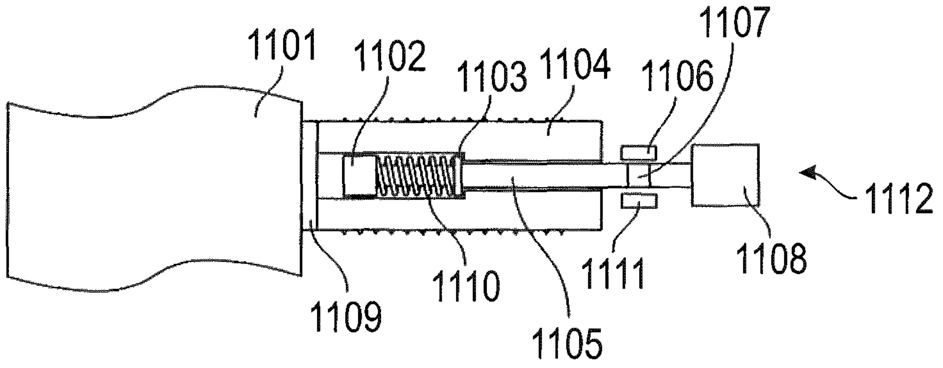
FIG. 11B is a cross-sectional side-elevation view of an electromagnet locking mechanism with spring retraction, shown in an extended position, according to one embodiment.

Referring now to FIG. 11B, the locking mechanism 1112 depicted in FIG. 11A is shown in locked state (e.g. an extended position), according to one embodiment. The energization of the electromagnet 1104 creates an attractive force between the electromagnet 1104 and the sash frame 1101, which causes the electromagnet 1104 to move towards the sash frame 1101, such that the contact plate 1109 is in contact with the sash frame 1101. The movement of electromagnet 1104 also moves the washer 1103 in the same direction by the same amount. As a result, the spring 1110 is compressed between the spring retention head 1102 and the washer 1103. When the electromagnet 1104 is not energized, the spring 1110 forces the electromagnet 1104 back into its retracted position.

In some embodiments, the locking mechanism 1112 may be connected to sensing components, such as the sensor assembly 708 depicted in FIG. 7. The conductive point 1107 and one or both of the first conductive plate 1106 and the second conductive plate 1111 may be included the sensor assembly 708. In other embodiments, the conductive point 1107 and one or both of the first conductive plate 1106 and the second conductive plate 1111 may be coupled to a controller, such as the controller 706 depicted in FIG. 7. The conductive point 1107 and one or both of the first conductive plate 1106 and the second conductive plate 1111 may be used to create a single pole, single or double throw switch (e.g. a circuit breaker, control, etc.). The conductive point 1107 serves as the input terminal and the first conductive plate 1106 and/or the second conductive plate 1111 serve as the output terminal(s). When the locking mechanism 1112 is in an extended position, movement of the sash frame 1101 downward deforms the support arm 1105 and completes a circuit between the conductive point 1107 and the second conductive plate 1111. Movement of the sash frame 1101 upward deforms the support arm 1105 and completes a circuit between the conductive point 1107 and the first conductive plate 1106. The controller 706 may be configured to receive signals from the sensor assembly 708 or the single pole, single or double throw switch and determine the motion of the sash frame 1101. The second conductive plate 1111 may be offset at a greater distance than the first conductive plate 1106 to account for the deformation of the support arm 1105 when the locking mechanism 1112 is supporting the weight of a sash, such as the sash 905 depicted in FIG. 9B.

Referring now to both FIGS. 11A and 11B, the locking mechanism 1112 may be coupled to control components, such as the lock activator 701 depicted in FIG. 7. The electromagnet 1104 may be coupled to the lock activator 701. A controller, such as the controller 706 depicted in FIG. 7, may be configured to command the lock activator 701 to energize the electromagnet 1104 by supplying the electromagnet 1104 with an electrical current. When the electromagnet 1104 is supplied with an electrical current, the electromagnet 1104 becomes energized. Thus, the locking mechanism 1112 may be commanded, via communication between the controller 706 and the lock activator 701, to selectively inhibit motion of a sash, such as the sash 905 depicted in FIG. 9B, by transitioning the locking mechanism 1112 between a locked state (e.g. a closed configuration; a configuration where the electromagnet 1104 is energized, the locking mechanism 1112 transitions to an extended state, and therefore the attractive force between the electromagnet 1104 and the sash frame 1101 prevents movement of the sash 905; etc.) and an unlocked state (e.g. an open configuration; a configuration where the electromagnet 1104 is de-energized, the locking mechanism 1112 transitions to a retracted state, and therefore the sash 905 is free to move; etc.).

Figure 12:
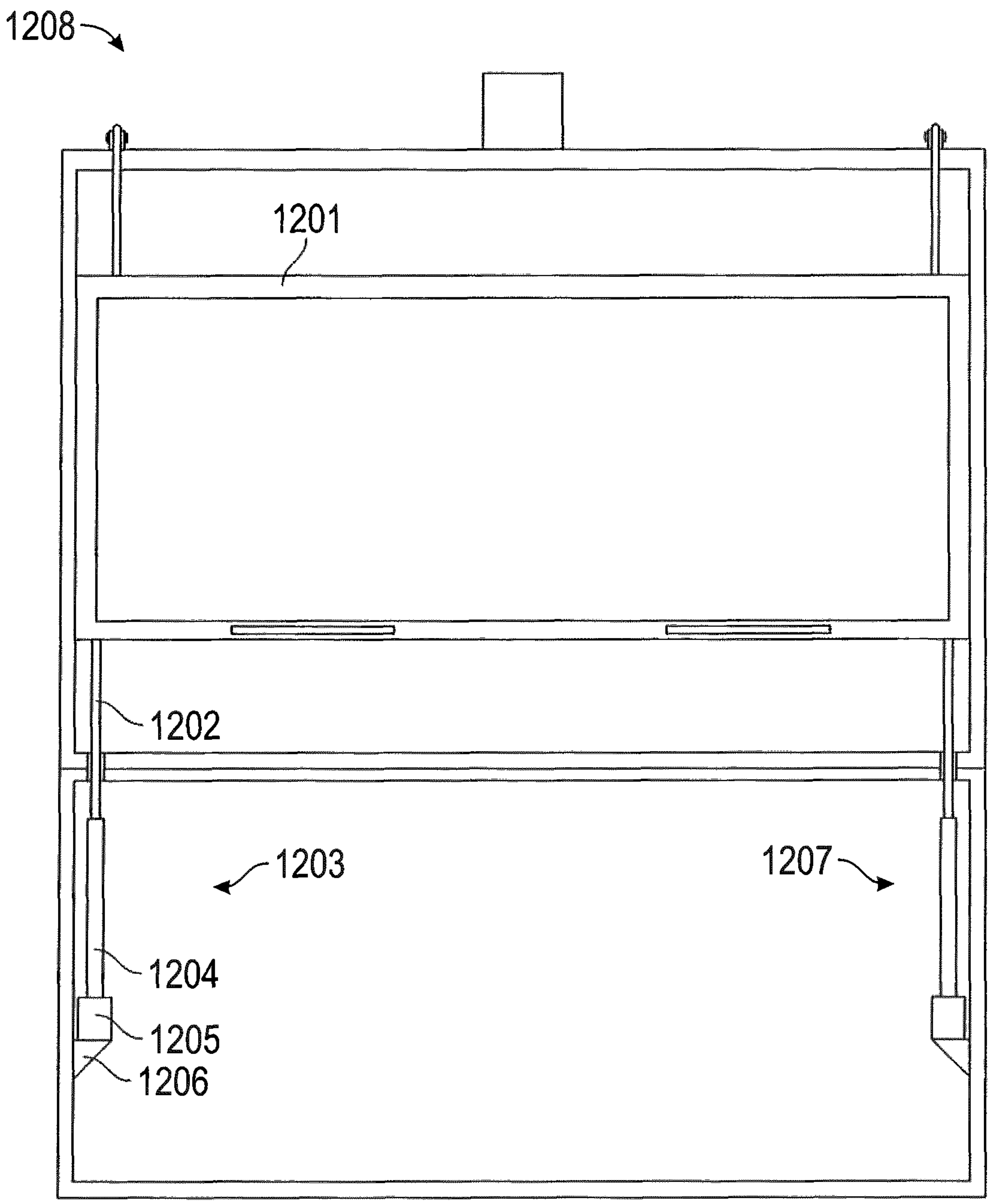
FIG. 12 is a front view of a pneumatically controlled automatic sash closing mechanism, according to one embodiment.

Referring now to FIG. 12, a pneumatically controlled automatic sash closing mechanism 1208 is shown, according to one embodiment. The sash closing mechanism 1208 includes first controlled descent cylinder 1203. The first controlled descent cylinder 1203 includes a piston rod 1202, a barrel 1204, and a valve set 1205. The first controlled descent cylinder 1203 may also include a piston and other components required for the first controlled descent cylinder 1203 to operate as a pneumatic cylinder. The first controlled descent cylinder 1203 is supported by a support 1206 and coupled to the bottom edge of a sash 1201. In some embodiments, a second controlled descent cylinder 1207 may be used which may be identical to or a mirrored version of the first controlled descent cylinder 1203. In other embodiments, a third or more controlled descent cylinders may be used.

The valve set 1205 may include a plurality of valves that are connected to the first controlled descent cylinder 1203. The plurality of valves may include, but are not limited to, a one-way valve that allows air into the barrel 1204 so that the piston rod 1202 can be extended unimpeded, an electrically controlled release valve to allow air to escape from the barrel 1204 for automatic descent of the sash 1201, and an explosive release valve to allow air to escape from the barrel 1204 when the internal pressure exceeds a set threshold, to allow a person to manually close the sash 1201. The barrel 1204 and/or one or more valves in the valve set 1205 may be equipped with pressure sensors to monitor forces exerted on the sash 1201.

In some embodiments, the first controlled descent cylinder 1203 is connected to control components, such as the lock activator 701 depicted in FIG. 7. An electrically controlled release valve included in the valve set 1205 may be coupled to the lock activator 701. A controller, such as the controller 706 depicted in FIG. 7, may be configured to command the lock activator 701 to supply the electronically controlled release valve with an electric signal to allow air to escape the barrel 1204 for automatic descent of the sash 1201. Thus, the first controlled descent cylinder 1203 may be commanded, via communication between the controller 706 and the lock activator 701, to selectively inhibit motion of the sash 1201 by transitioning the first controlled descent cylinder 1203 between a locked state (e.g. a closed configuration; a configuration where the electronically controlled release valve does not allow air to escape from the barrel 1204 and therefore prevents movement of the sash 1201; etc.) and an unlocked state (e.g. an open configuration; a configuration where the electromagnet electronically controlled release valve allows air to escape from the barrel 1204 and therefore the sash 1201 is allowed to descend; etc.).

In some embodiments, the first controlled descent cylinder 1203 is connected to sensing components, such as the sensor assembly 708 depicted in FIG. 7. A pressure sensor may be coupled to the barrel 1204 and be included in the sensor assembly 708. In other embodiments, the pressure sensor may be coupled to a controller, such as the controller 706 depicted in FIG. 7. Motion in the sash 1201 may increase or decrease the portion of the piston rod 1202 that is positioned within the barrel 1204, therefore changing the pressure in the barrel 1204. The pressure sensor may be configured to read such changes in the pressure in the barrel 1204. The controller 706 may be configured to receive signals from the sensor assembly 708 or the pressure sensor and determine motion in the sash 1201.

Figure 13:
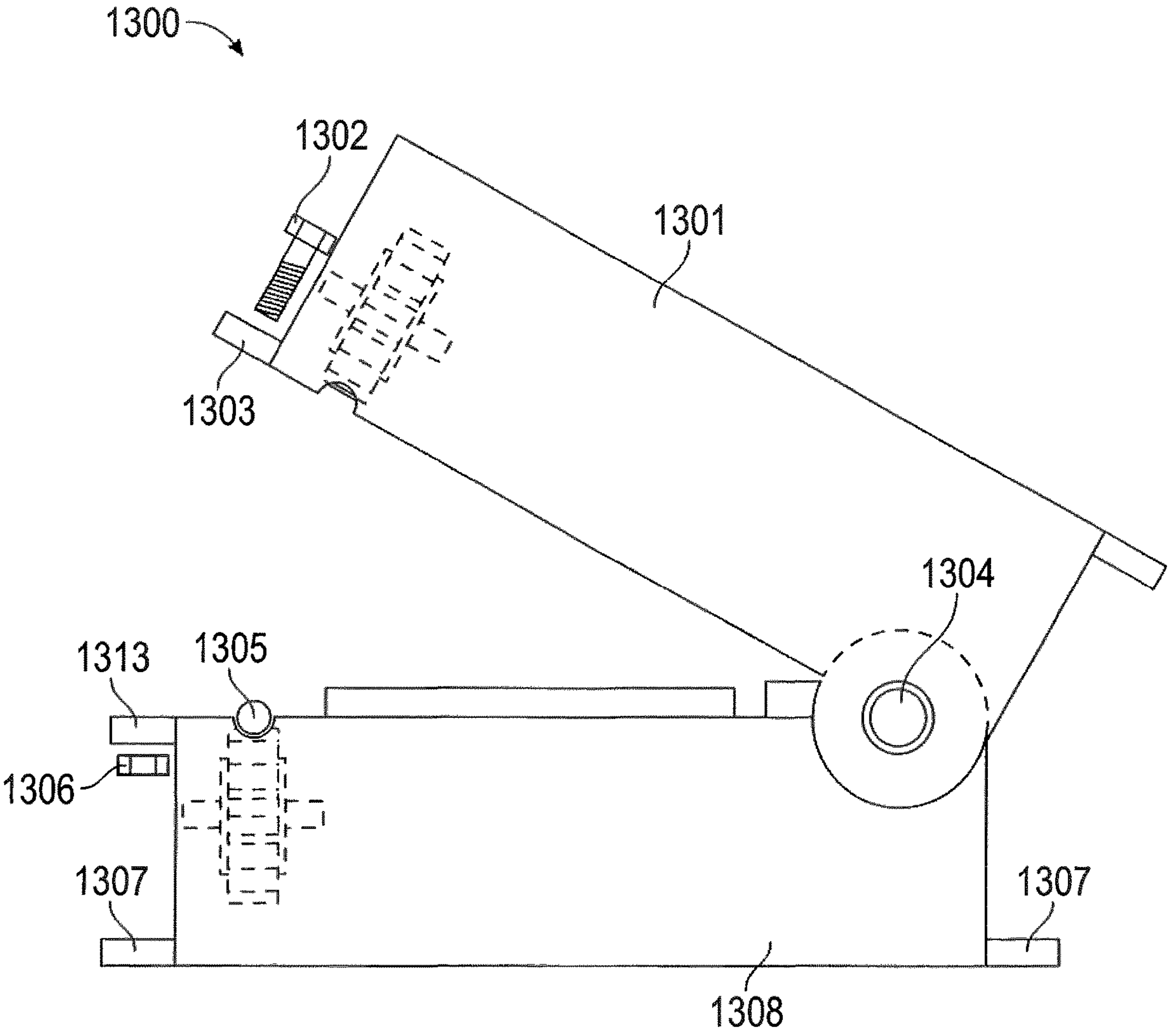
FIG. 13 is a side-elevation view of a housing for a locking mechanism, according to one embodiment.

Referring now to FIG. 13, a hinged housing 1300 for a locking mechanism is shown, according to one embodiment. The locking mechanism may be, for example, the locking mechanism 600 depicted in FIGS. 6A-6B. The hinged housing 1300 includes an upper hinged housing 1301 coupled to a lower housing 1308 via a hinge 1304, attachment tabs 1307 coupled to the lower housing 1308, a first sealing tab 1313 coupled to the lower housing 1308, a second sealing tab 1303 coupled to the upper hinged housing 1301, a bolt 1302, and a nut 1306. In some embodiments, the hinged housing 1300 may include all or the majority of components depicted in relation to the locking mechanism 600. For example, the locking mechanism 600 may be at least partially positioned within the hinged housing 1300 and at least a portion of the coupling member 604 may pass through or proximate the hinged housing 1300. The housing 601 as depicted in FIGS. 6A-6B may be divided into an upper housing and a lower housing as shown by the division of the hinged housing 1300 into the upper hinged housing 1301 and the lower housing 1308. The hinged housing 1300 may be used in a retrofit installation to attach a locking mechanism, such as the locking mechanism 600, to a coupling member, such as a coupling member 1305 or the coupling member 604, with minimal disruption to a fume hood, such as the fume hood 100 depicted in FIGS. 1A-1B. The lower housing 1308 may be placed underneath the coupling member 1305, attached to the fume hood 100 through the application of screws or bolts through the attachment tabs 1307. The upper hinged housing 1301 may then be lowered into place above the coupling member 1305. The upper hinged housing 1301 and the lower housing 1308 may be secured together by threading the bolt 1302 through the first sealing tab 1313 and the second sealing tab 1303, and attaching the nut 1306.

Figure 14:
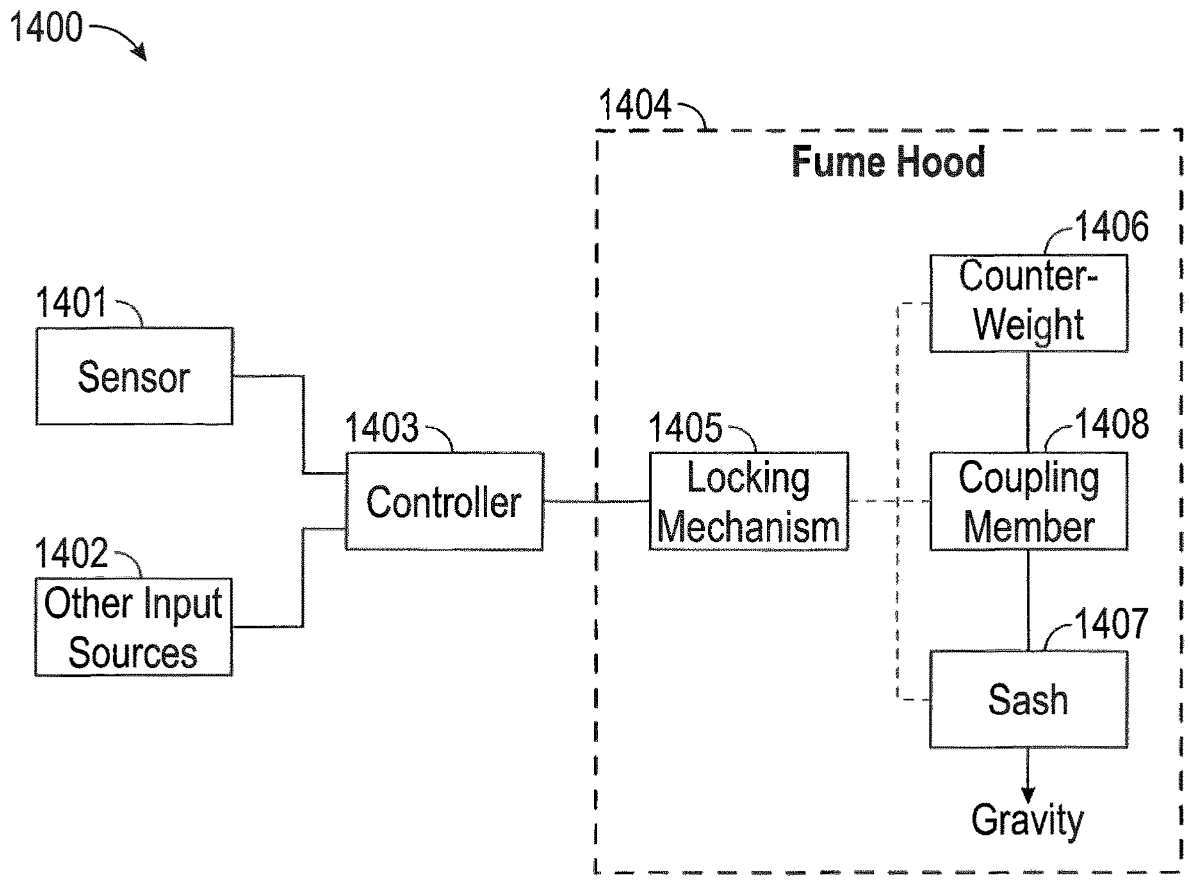
FIG. 14 is a schematic representation of a system for a fume hood, according to one embodiment.

Referring now to FIG. 14, a schematic representation of a system 1400 (e.g., a sash system) is shown, according to one embodiment. System 1400 includes a fume hood 1404, a controller 1403, a sensor 1401, and other input sources 1402. The fume hood 1404 includes a sash 1407 coupled to a counter-weight 1406 by a coupling member 1408. A locking mechanism 1405 is configured to act on one or both of the sash 1407 or the counter-weight 1406. The controller 1403 controls operation of the locking mechanism 1405 based on data received from the sensor 1401 and/or the other input sources 1402.

The sensor 1401 may be or include a variety of sensors, including a motion sensor, a proximity sensor, a bend sensor, a pressure sensor, etc.

Other input sources 1402 may be or include a variety of input sources, including a VAV controller, a building fire panel, a power status indicator, an occupancy monitoring system, etc.

In one embodiment, the sensor 1401, controller 1403, and locking mechanism 1405 may be co-located and/or provided within a common housing (e.g., as an integrated locking mechanism, etc.). In other embodiments, any of these components may be co-located and provided within a common housing (e.g., the sensor 1401 and the controller 1403, etc.) to provide an integrated locking mechanism, etc.

In operation, the sash 1407 is positioned in a first position. For example, a user may manually open the sash 1407 to the first position in order to perform work in the interior of the fume hood 1404. The controller 1403 receives data from the sensor 1401 and/or other input sources 1402. For example, the sensor 1401 may sense the absence of a user proximate the fume hood 1404 for a predetermined period of time. Alternatively, the sensor 1401 may sense an abnormal speed/direction of movement of the sash 1407. In further embodiments, a VAV controller may provide a control signal to the controller 1403. In yet further embodiments, the controller 1403 may receive an alert from a fire panel, occupancy monitoring system, or other building system.

Based on the received data, the controller 1403 controls operation of the locking mechanism 1405. For example, the controller may transition the locking mechanism 1405 between a first configuration, where the locking mechanism inhibits movement of the sash 1407 and/or coupling member 1408, and a second configuration, where the locking mechanism 1405 allows generally free movement of the sash 1407 and coupling member 1408. The sash 1407, coupling member 1408, and counter-weight 1406 are configured such that when the locking mechanism 1405 is in the second configuration and the sash 1407 and coupling member 1408 are generally free to move, the sash tends to move toward a closed position due to the force of gravity.

It should be noted that the system 1400 shown in FIG. 14 may include any of the features discussed with respect to the other embodiments disclosed elsewhere herein, including the use of multiple coupling members, multi-portioned counter-weights, differing types of sensors, locking mechanisms, etc. Similarly, any of the features of FIG. 14 may be incorporated into the other embodiments disclosed herein. All such combinations of features are to be understood to be within the scope of the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the counter-weight 407 that includes a counter-weight section 409 of the embodiment depicted in at least FIG. 4 may be incorporated in the fume hood that includes a locking mechanism that operates directly on a sash of the embodiment depicted in at least FIG. 9A. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A sash system, comprising:
- a sash;
- a counter-weight coupled to the sash by a coupling member;
- a locking mechanism coupled to at least one of the sash and the coupling member and transitionable between an open configuration where the locking mechanism does not inhibit movement of the at least one of the sash and the coupling member, and a locked configuration where the locking mechanism inhibits movement of the at least one of the sash and the coupling member; and
- a controller coupled to the locking mechanism and configured to control operation of the locking mechanism to selectively transition between the open configuration and the locked configuration based on a condition of the sash;
- wherein the sash and the counter-weight are configured such that when the locking mechanism is in the open configuration, the sash lowers due to gravity, wherein the controller is configured to transition the locking mechanism to the locked configuration based on the condition being a first condition;
  - wherein the controller is configured to transition the locking mechanism to the open configuration based on the condition being a second condition different from the first condition;
  - wherein the first condition comprises at least one of:
    - the sash lowering solely due to an effect of gravity, and
    - the locking mechanism is in the open configuration and the sash not lowering;
  - wherein the second condition comprises at least one of:
    - the sash being manually moved,
    - a time since a last movement of the sash exceeding a first threshold value,
    - no person being detected proximate to the sash, and
  - a time elapsed since a person was detected proximate to the sash exceeding a second threshold value.

2. The system of claim 1, wherein a total mass of the counter-weight is less than a total mass of the sash.

3. The system of claim 1, wherein the counter-weight comprises a primary portion and one or more secondary portions configured to be removed or attached to the primary portion such that a total mass of the counter-weight is adjustable.

4. The system of claim 1, wherein the coupling member is coupled to a top of the sash and a top of the counter-weight.

5. The system of claim 1, further comprising a housing, wherein the locking mechanism is at least partially positioned within the housing and wherein at least a portion of the coupling member passes through or proximate the housing.

6. The system of claim 1, further comprising a sensor assembly coupled to the controller;
- wherein the sensor assembly is configured to sense condition data associated with the sash and communicate the condition data to the controller;
- wherein the controller is configured to determine the condition of the sash based on the condition data.

7. The system of claim 1, wherein the locking mechanism comprises:
- a motor coupled to a rotational member positioned to engage the coupling member, wherein the locking mechanism selectively inhibits the movement of the sash by operating the motor.

8. The system of claim 1, wherein the locking mechanism comprises a pneumatic assembly configured to selectively inhibit downward motion of the sash.

9. A sash system, comprising:
- a sash;
- a counter-weight coupled to the sash by a coupling member;
- a locking mechanism coupled to at least one of the sash and the coupling member and transitionable between an open configuration where the locking mechanism does not inhibit movement of the at least one of the sash and the coupling member, and a locked configuration where the locking mechanism inhibits movement of the at least one of the sash and the coupling member; and
- a controller coupled to the locking mechanism and configured to control operation of the locking mechanism to selectively transition between the open configuration and the locked configuration based on a condition of the sash;
- wherein the sash and the counter-weight are configured such that when the locking mechanism is in the open configuration, the sash lowers due to gravity wherein the coupling member comprises an upper segment and a lower segment;
- wherein the upper segment is coupled to a top of the sash and a top of the counter-weight;
- wherein the lower segment is coupled to a bottom of the sash and a bottom of the counter-weight.

10. The system of claim 9, wherein the controller is configured to transition the locking mechanism to the locked configuration based on the condition being a first condition;
- wherein the controller is configured to transition the locking mechanism to the open configuration based on the condition being a second condition different from the first condition;
- wherein the first condition comprises at least one of:
  - the sash lowering solely due to an effect of gravity, and
  - the locking mechanism is in the open configuration and the sash not lowering;
- wherein the second condition comprises at least one of:
  - the sash being manually moved,
  - a time since a last movement of the sash exceeding a first threshold value, no person being detected proximate to the sash, and a time elapsed since a person was detected proximate to the sash exceeding a second threshold value.

11. A sash system, comprising:

a sash;

a counter-weight coupled to the sash by a coupling member;

a locking mechanism coupled to at least one of the sash and the coupling member and transitionable between an open configuration where the locking mechanism does not inhibit movement of the at least one of the sash and the coupling member, and a locked configuration where the locking mechanism inhibits movement of the at least one of the sash and the coupling member; and a controller coupled to the locking mechanism and configured to control operation of the locking mechanism to selectively transition between the open configuration and the locked configuration based on a condition of the sash;

wherein the locking mechanism comprises a gripping member and an electromagnet;

wherein the locking mechanism selectively inhibits motion of the sash by engaging the gripping member with the coupling member;

wherein the gripping member is configured to engage the coupling member due to an electromagnetic force acting between the electromagnet and the gripping member.

12. A sash system, comprising:

a sash;

a counter-weight coupled to the sash by a coupling member;

a locking mechanism coupled to at least one of the sash and the coupling member and transitionable between an open configuration where the locking mechanism does not inhibit movement of the at least one of the sash and the coupling member, and a locked configuration where the locking mechanism inhibits movement of the at least one of the sash and the coupling member; and a controller coupled to the locking mechanism and configured to control operation of the locking mechanism to selectively transition between the open configuration and the locked configuration based on a condition of the sash;

wherein the sash includes a ferromagnetic portion;

wherein the locking mechanism comprises an electromagnet;

wherein the locking mechanism is configured to selectively inhibit motion of the sash due to an electromagnetic force between the electromagnet and the ferromagnetic portion of the sash when the electromagnet is energized.

13. A method of controlling movement of a sash, the method comprising:

providing a sash coupled to a counter-weight by a coupling member;

determining, using a controller, a condition of the sash;

operating, by the controller, a locking mechanism based on the condition of the sash to transition the locking mechanism between an open configuration where the locking mechanism does not inhibit movement of at least one of the sash and the coupling member and a locked configuration where the locking mechanism inhibits movement of the at least one of the sash and the coupling member;

wherein the counter-weight provides a balancing force against weight of the sash, and wherein when the locking mechanism is in the open configuration, the sash tends to move toward a closed position;

transitioning, using the controller, the locking mechanism to the locked configuration based on the condition being a first condition;

transitioning, using the controller, the locking mechanism to the open configuration based on the condition being a second condition different from the first condition;

wherein the first condition comprises at least one of:

the sash lowering solely due to an effect of gravity, and the locking mechanism is in the open configuration and the sash not lowering;

wherein the second condition comprises at least one of:

the sash being manually moved, a time since a last movement of the sash exceeding a first threshold value, no person being proximate to the sash, and a time elapsed since a person was proximate to the sash exceeding a second threshold value.

14. The method of claim 13, further comprising:

sensing, by a sensor, condition data associated with the sash;

providing the condition data of the sash to the controller;

determining, by the controller, the condition of the sash based on the condition data.

15. The method of claim 13, wherein the coupling member comprises an upper segment and a lower segment;

wherein the upper segment is coupled to a top of the sash and a top of the counter-weight;

wherein the lower segment is coupled to a bottom of the sash and a bottom of the counter-weight.

16. A hood enclosure assembly, comprising:

a hood enclosure positioned within an environment and comprising a plurality of sidewalls forming a work chamber and a front aperture configured to permit airflow between the environment and the work chamber;

a sash adjustably coupled to the hood enclosure, wherein the sash is adjustable to cover at least a portion of the front aperture;

a counter-weight coupled to the sash by a coupling member;

a locking mechanism operatively coupled to at least one of the sash and the coupling member; and a controller configured to control operation of the locking mechanism to selectively inhibit movement of the sash based on a condition of the sash;

wherein when the locking mechanism does not inhibit movement of the sash, the sash tends to lower, wherein the coupling member comprises an upper segment and a lower segment;

wherein the upper segment is coupled to a top of the sash and a top of the counter-weight;

wherein the lower segment is coupled to a bottom of the sash and a bottom of the counter-weight.

17. The assembly of claim 16, wherein the locking mechanism is transitioned to a locked configuration based on the condition being a first condition and to an open position based on the condition being a second condition different from the first condition;

wherein the first condition comprises at least one of:

the sash lowering solely due to an effect of gravity, and the locking mechanism is in the open position and the sash not lowering;

wherein the second condition comprises at least one of:

the sash being manually moved, a time since a last movement of the sash exceeding a first threshold value, no person being proximate to the sash, and a time elapsed since a person was proximate to the sash exceeding a second threshold value.

18. The hood enclosure assembly of claim 16, wherein a total mass of the counter-weight is less than a total mass of the sash.

19. The hood enclosure assembly of claim 16, wherein the coupling member comprises a cable.

20. The hood enclosure assembly of claim 16, wherein the coupling member is coupled to a top of the sash and a top of the counter-weight.

* * * * *